United States Patent
Li et al.

(10) Patent No.: US 12,519,600 B2
(45) Date of Patent: Jan. 6, 2026

(54) CHANNEL STATE FEEDBACK FOR RECEIVE ANTENNA SWITCHING

(71) Applicant: QUALCOMM INCORPORATED, San Diego, CA (US)

(72) Inventors: Qiaoyu Li, Beijing (CN); Chao Wei, Beijing (CN); Jing Lei, San Diego, CA (US); Hao Xu, Beijing (CN); Chenxi Hao, Beijing (CN); Jing Dai, Beijing (CN); Peter Pui Lok Ang, San Diego, CA (US); Hwan Joon Kwon, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 327 days.

(21) Appl. No.: 17/802,409

(22) PCT Filed: Apr. 29, 2020

(86) PCT No.: PCT/CN2020/087755
§ 371 (c)(1),
(2) Date: Aug. 25, 2022

(87) PCT Pub. No.: WO2021/217489
PCT Pub. Date: Nov. 4, 2021

(65) Prior Publication Data
US 2023/0224134 A1    Jul. 13, 2023

(51) Int. Cl.
*H04L 5/00* (2006.01)
*H04B 7/06* (2006.01)

(52) U.S. Cl.
CPC ......... *H04L 5/0057* (2013.01); *H04B 7/0608* (2013.01); *H04L 5/0048* (2013.01)

(58) Field of Classification Search
CPC ... H04L 1/0026; H04L 5/0048; H04L 5/0057; H04B 7/0608; H04B 7/0626; H04B 7/0632
See application file for complete search history.

(56) References Cited

U.S. PATENT DOCUMENTS

| | | | |
|---|---|---|---|
| 11,791,874 B2 | 10/2023 | Wei et al. | |
| 2009/0213955 A1* | 8/2009 | Higuchi | H04B 7/0669 375/267 |

(Continued)

FOREIGN PATENT DOCUMENTS

| | | |
|---|---|---|
| CN | 109802801 A | 5/2019 |
| CN | 110650001 A | 1/2020 |

(Continued)

OTHER PUBLICATIONS

Samsung: "UE Adaptation to Maximum Number of MIMO Layers", 3GPP TSG RAN WG1 #98bis, R1-1910499, 3rd Generation Partnership Project, Mobile Competence Centre, 650, Route Des Lucioles, F-06921 Sophia-Antipolis Cedex, vol. RAN WG1, No. Chongqing, China, Oct. 14, 2019-Oct. 18, 2019, Oct. 4, 2019, 5 Pages, XP051808219, the whole document.

(Continued)

*Primary Examiner* — Jeong S Park
(74) *Attorney, Agent, or Firm* — Holland & Hart LLP

(57) ABSTRACT

Methods, systems, and devices for wireless communications are described. A user equipment (UE) and a base station may perform one or more operations for receive antenna switching. For example, a UE may receive a set of reference signals from a base station using one or more ports of the UE. Based on receiving the set of reference signals, the UE may generate channel state information (CSI) associated with a set of antenna ports. In some cases, the UE may generate CSI based on receiving a configuration indicating the set of antenna ports. The UE may transmit, to the base (Continued)

station, a CSI report including the CSI information associated with the set of antenna ports and an indication of the associated antenna ports. The base station may receive the CSI report and may communicate with the UE using a set of precoders associated with the set of indicated antennas ports.

18 Claims, 24 Drawing Sheets

(56) References Cited

U.S. PATENT DOCUMENTS

| | | | |
|---|---|---|---|
| 2016/0043791 A1* | 2/2016 | Nam | H04B 7/0626 |
| | | | 375/267 |
| 2016/0191135 A1* | 6/2016 | Chen | H04W 72/02 |
| | | | 370/329 |
| 2018/0019795 A1* | 1/2018 | Zhang | H04L 1/00 |
| 2018/0145809 A1* | 5/2018 | Kwak | H04L 25/0228 |
| 2018/0254812 A1* | 9/2018 | Park | H04L 5/005 |
| 2018/0375561 A1 | 12/2018 | Park et al. | |
| 2019/0297603 A1 | 9/2019 | Guo et al. | |
| 2019/0349051 A1 | 11/2019 | Sarkis et al. | |
| 2020/0092073 A1* | 3/2020 | Papasakellariou | H04W 72/0446 |
| 2020/0145075 A1* | 5/2020 | Hao | H04B 7/0626 |
| 2021/0050896 A1* | 2/2021 | Nammi | H04L 5/0048 |

FOREIGN PATENT DOCUMENTS

| | | |
|---|---|---|
| WO | WO-2019237303 A1 | 12/2019 |
| WO | 2020019136 A1 | 1/2020 |

OTHER PUBLICATIONS

Supplementary European Search Report—EP20933111—Search Authority—Munich—Jan. 30, 2024.
Huawei, et al., "UE Dynamic Adaptation to the Maximum Number of MIMO Layer", 3GPP TSG RAN WG1 Meeting #98bis, 3GPP Draft, R1-1910078, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, 5 Pages, Oct. 5, 2019 (Oct. 5, 2019), XP051788885, Retrieved from the Internet: URL: http://www.3qpp.org/ftp/tsg_ran/WG1_RL1/TSGR1_98b/Docs/R1-1910078.zip [retrieved on Oct. 5, 2019] Section 2.2, Sections 2-3, the whole document.
International Search Report and Written Opinion—PCT/CN2020/087755—ISA/EPO—Jan. 29, 2021.
VIVO: "Remaining Aspects of Maximum Number of MIMO Layers", 3GPP TSG RAN WG1 #99, R1-1912051, Reno, USA, Nov. 18, 2019-Nov. 22, 2019, 3 Pages, Nov. 22, 2019 (Nov. 22, 2019) the whole document.

\* cited by examiner

CHANNEL STATE FEEDBACK FOR RECEIVE ANTENNA SWITCHING

CROSS REFERENCE

The present Application is a 371 national stage filing of International PCT Application No. PCT/CN2020/087755 by LI et al. entitled "CHANNEL STATE FEEDBACK FOR RECEIVE ANTENNA SWITCHING," filed Apr. 29, 2020, which is assigned to the assignee hereof, and which is expressly incorporated by reference in its entirety herein

FIELD OF TECHNOLOGY

The following relates generally to wireless communications and more specifically to channel state feedback for receive antenna switching.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may be a reduced complexity UE that is configured with a limited number of antennas in order to reduce communication complexity and the physical size of the UE. These UEs, however, may still operate according to standards designed for UEs of higher complexity. For example, antenna switching may be one technique that is designed for use by higher complexity UEs to increase spatial diversity, and reduced complexity UEs, or other UEs supporting communications via a limited number of antennas, may be unable to operate efficiently using these techniques.

SUMMARY

The described techniques relate to improved methods, systems, devices, and apparatuses that support channel state feedback for receive antenna switching. Generally, the described techniques provide for enhanced channel state information (CSI) reporting mechanisms which may enable a UE to indicate a receive antenna port in a CSI report to a base station for downlink communications as part of a receive antenna switching procedure. For example, a base station may use antenna-specific precoders to enhance communication with a UE, but may not be aware of which receive antenna is enabled at the UE. In such cases, the UE may indicate in a CSI report that the associated CSI corresponds to a particular receive antenna port. The base station may determine a suitable precoder for the indicated receive antenna port based on the received indication and may communicate with the UE based on the determined precoder.

A method of wireless communications at a UE is described. The method may include receiving a reference signal from a base station, generating channel state information associated with a set of UE receive antenna ports based on the reference signal received from the base station, and transmitting a channel state information report to the base station, the channel state information report including the channel state information associated with the set of UE receive antenna ports and an indication of the set of UE receive antenna ports.

An apparatus for wireless communications at a UE is described. The apparatus may include a processor, memory coupled with the processor, and instructions stored in the memory. The instructions may be executable by the processor to cause the apparatus to receive a reference signal from a base station, generate channel state information associated with a set of UE receive antenna ports based on the reference signal received from the base station, and transmit a channel state information report to the base station, the channel state information report including the channel state information associated with the set of UE receive antenna ports and an indication of the set of UE receive antenna ports.

Another apparatus for wireless communications at a UE is described. The apparatus may include means for receiving a reference signal from a base station, generating channel state information associated with a set of UE receive antenna ports based on the reference signal received from the base station, and transmitting a channel state information report to the base station, the channel state information report including the channel state information associated with the set of UE receive antenna ports and an indication of the set of UE receive antenna ports.

A non-transitory computer-readable medium storing code for wireless communications at a UE is described. The code may include instructions executable by a processor to receive a reference signal from a base station, generate channel state information associated with a set of UE receive antenna ports based on the reference signal received from the base station, and transmit a channel state information report to the base station, the channel state information report including the channel state information associated with the set of UE receive antenna ports and an indication of the set of UE receive antenna ports.

In some examples of the method, apparatuses, and non-transitory computer-readable medium described herein, generating the channel state information may include operations, features, means, or instructions for determining a set of channel quality parameters for the reference signal using the set of UE receive antenna ports, where the channel state information report includes the set of channel quality parameters.

In some examples of the method, apparatuses, and non-transitory computer-readable medium described herein, each channel quality parameter of the set of channel quality parameters may be associated with the set of UE receive antenna ports indicated by the channel state information report.

In some examples of the method, apparatuses, and non-transitory computer-readable medium described herein, the indication of the set of UE receive antenna ports includes a set of receive antenna port indexes corresponding to the set of UE receive antenna ports.

Some examples of the method, apparatuses, and non-transitory computer-readable medium described herein may further include operations, features, means, or instructions for receiving a downlink message from the base station based on one or more precoders associated with the indication of the set of UE receive antenna ports.

Some examples of the method, apparatuses, and non-transitory computer-readable medium described herein may further include operations, features, means, or instructions for receiving multiple repetitions of a downlink message from the base station based on one or more precoders associated with the indication of the set of UE receive antenna ports.

Some examples of the method, apparatuses, and non-transitory computer-readable medium described herein may further include operations, features, means, or instructions for receiving a control channel message including scheduling information for a downlink message for the UE and an indication of a receive antenna port for the UE to use for receiving the downlink message.

Some examples of the method, apparatuses, and non-transitory computer-readable medium described herein may further include operations, features, means, or instructions for receiving the downlink message using the receive antenna port indicated in the control channel message.

Some examples of the method, apparatuses, and non-transitory computer-readable medium described herein may further include operations, features, means, or instructions for receiving an indication of an association between a resource for the reference signal and the receive antenna port.

Some examples of the method, apparatuses, and non-transitory computer-readable medium described herein may further include operations, features, means, or instructions for receiving the indication via a transmission configuration indicator.

Some examples of the method, apparatuses, and non-transitory computer-readable medium described herein may further include operations, features, means, or instructions for receiving the indication via downlink control information.

A method of wireless communications at a UE is described. The method may include receiving, from a base station, a configuration for reporting channel state information by the UE, the configuration indicating a group of receive antenna ports for the UE to associate with channel state information reports, generating channel state information associated with the group of receive antenna ports indicated by the configuration, and transmitting, to the base station, a channel state information report including the channel state information associated with the group of receive antenna ports indicated by the configuration.

An apparatus for wireless communications at a UE is described. The apparatus may include a processor, memory coupled with the processor, and instructions stored in the memory. The instructions may be executable by the processor to cause the apparatus to receive, from a base station, a configuration for reporting channel state information by the UE, the configuration indicating a group of receive antenna ports for the UE to associate with channel state information reports, generate channel state information associated with the group of receive antenna ports indicated by the configuration, and transmit, to the base station, a channel state information report including the channel state information associated with the group of receive antenna ports indicated by the configuration.

Another apparatus for wireless communications at a UE is described. The apparatus may include means for receiving, from a base station, a configuration for reporting channel state information by the UE, the configuration indicating a group of receive antenna ports for the UE to associate with channel state information reports, generating channel state information associated with the group of receive antenna ports indicated by the configuration, and transmitting, to the base station, a channel state information report including the channel state information associated with the group of receive antenna ports indicated by the configuration.

A non-transitory computer-readable medium storing code for wireless communications at a UE is described. The code may include instructions executable by a processor to receive, from a base station, a configuration for reporting channel state information by the UE, the configuration indicating a group of receive antenna ports for the UE to associate with channel state information reports, generate channel state information associated with the group of receive antenna ports indicated by the configuration, and transmit, to the base station, a channel state information report including the channel state information associated with the group of receive antenna ports indicated by the configuration.

Some examples of the method, apparatuses, and non-transitory computer-readable medium described herein may further include operations, features, means, or instructions for determining a set of repeated resources for a reference signal from the base station based on the configuration, and receiving, from the base station, the reference signal via the set of repeated resources using the group of receive antenna ports, where the channel state information may be generated based on the reference signal received from the base station.

In some examples of the method, apparatuses, and non-transitory computer-readable medium described herein, the set of repeated resources may be within a slot.

In some examples of the method, apparatuses, and non-transitory computer-readable medium described herein, the set of repeated resources may be resources for channel state information reference signals.

Some examples of the method, apparatuses, and non-transitory computer-readable medium described herein may further include operations, features, means, or instructions for determining one or more channel quality parameters for the group of receive antenna ports, where the one or more channel quality parameters include a precoding matrix indicator (PMI) or a channel quality indicator (CQI).

Some examples of the method, apparatuses, and non-transitory computer-readable medium described herein may further include operations, features, means, or instructions for determining a set of channel quality parameters, each channel quality parameter corresponding to a respective receive antenna port of the group of receive antenna ports, and transmitting the set of channel quality parameters in the channel state information report.

In some examples of the method, apparatuses, and non-transitory computer-readable medium described herein, each channel quality parameter corresponds to a respective repeated resource of a set of repeated resources for a set of reference signals.

Some examples of the method, apparatuses, and non-transitory computer-readable medium described herein may further include operations, features, means, or instructions for determining a joint channel quality parameter that corresponds to the group of receive antenna ports, determining a set of differential channel quality parameters corresponding to respective receive antenna ports of the group of receive antenna ports, where each differential channel quality parameter corresponds to a difference in channel quality with respect to the joint channel quality parameter, and transmitting the joint channel quality parameter and the set of differential channel quality parameters in the channel state information report.

In some examples of the method, apparatuses, and non-transitory computer-readable medium described herein, each differential channel quality parameter may be a function of a number of repetitions of one or more reference signals from the base station.

Some examples of the method, apparatuses, and non-transitory computer-readable medium described herein may further include operations, features, means, or instructions for determining a common channel quality parameter that corresponds to the group of receive antenna ports, transmitting the common channel quality parameter in the channel state information report, and receiving multiple reference signals based on a common precoder corresponding to the common channel quality parameter and the group of receive antenna ports.

Some examples of the method, apparatuses, and non-transitory computer-readable medium described herein may further include operations, features, means, or instructions for determining an association between a downlink transmission occasion and a receive antenna port of the group of receive antenna ports, and receiving a set of reference signals from the base station based on the association.

In some examples of the method, apparatuses, and non-transitory computer-readable medium described herein, receiving the set of reference signals may include operations, features, means, or instructions for receiving a first reference signal of the set of reference signals during a first transmission occasion based on a first receive antenna port of the group based on the association, and receiving a second reference signal of the set of reference signals during a second transmission occasion based on a second receive antenna port of the group based on the association.

Some examples of the method, apparatuses, and non-transitory computer-readable medium described herein may further include operations, features, means, or instructions for transmitting a common channel quality parameter in the channel state information report, the common channel quality parameter indicating a preference to disable receive antenna port switching at the UE.

Some examples of the method, apparatuses, and non-transitory computer-readable medium described herein may further include operations, features, means, or instructions for receiving downlink control information from the base station, where the downlink control information includes an indication of precoder cycling for a set of downlink messages from the base station, and receiving the set of downlink messages using a set of receive antenna ports of the group of receive antenna ports based on the precoder cycling.

Some examples of the method, apparatuses, and non-transitory computer-readable medium described herein may further include operations, features, means, or instructions for receiving a reference signal from the base station, and generating the channel state information based on the reference signal.

A method of wireless communications at a base station is described. The method may include transmitting a set of reference signals to a UE, receiving a channel state information report from the UE, the channel state information report including channel state information associated with set of receive antenna ports of the UE and an indication of the set of receive antenna ports, and communicating with the UE using a set of precoders associated with the set of receive antenna ports based on receiving the channel state information report.

An apparatus for wireless communications at a base station is described. The apparatus may include a processor, memory coupled with the processor, and instructions stored in the memory. The instructions may be executable by the processor to cause the apparatus to transmit a set of reference signals to a UE, receive a channel state information report from the UE, the channel state information report including channel state information associated with set of receive antenna ports of the UE and an indication of the set of receive antenna ports, and communicate with the UE using a set of precoders associated with the set of receive antenna ports based on receiving the channel state information report.

Another apparatus for wireless communications at a base station is described. The apparatus may include means for transmitting a set of reference signals to a UE, receiving a channel state information report from the UE, the channel state information report including channel state information associated with set of receive antenna ports of the UE and an indication of the set of receive antenna ports, and communicating with the UE using a set of precoders associated with the set of receive antenna ports based on receiving the channel state information report.

A non-transitory computer-readable medium storing code for wireless communications at a base station is described. The code may include instructions executable by a processor to transmit a set of reference signals to a UE, receive a channel state information report from the UE, the channel state information report including channel state information associated with set of receive antenna ports of the UE and an indication of the set of receive antenna ports, and communicate with the UE using a set of precoders associated with the set of receive antenna ports based on receiving the channel state information report.

In some examples of the method, apparatuses, and non-transitory computer-readable medium described herein, the channel state information report includes a set of channel quality parameters for the set of reference signals, and each channel quality parameter of the set of channel quality parameters may be associated with the set of receive antenna ports indicated by the channel state information report.

In some examples of the method, apparatuses, and non-transitory computer-readable medium described herein, the indication of the set of receive antenna ports includes a set of receive antenna ports indexes corresponding to the set of receive antenna ports.

Some examples of the method, apparatuses, and non-transitory computer-readable medium described herein may further include operations, features, means, or instructions for determining a set of precoders for a set of downlink messages based on the channel state information and the indication of the set of receive antenna ports, and transmitting the set of downlink messages to the UE using the set of precoders.

In some examples of the method, apparatuses, and non-transitory computer-readable medium described herein, transmitting the set of downlink messages may include operations, features, means, or instructions for transmitting multiple repetitions of a downlink message to the UE using the set of precoders.

Some examples of the method, apparatuses, and non-transitory computer-readable medium described herein may further include operations, features, means, or instructions for transmitting a control channel message including scheduling information for a downlink message for the UE and an indication of a receive antenna port for the UE to use for receiving the downlink message, determining a set of precoders for the downlink message based on the channel state information and the indication of the set of receive antenna ports, and transmitting the downlink message to the UE using the set of precoders.

Some examples of the method, apparatuses, and non-transitory computer-readable medium described herein may further include operations, features, means, or instructions for transmitting an indication of an association between a resource for the set of reference signals and the receive antenna port.

Some examples of the method, apparatuses, and non-transitory computer-readable medium described herein may further include operations, features, means, or instructions for transmitting the indication via a transmission configuration indicator.

Some examples of the method, apparatuses, and non-transitory computer-readable medium described herein may further include operations, features, means, or instructions for transmitting the indication via downlink control information.

A method of wireless communications at a base station is described. The method may include transmitting, to a UE, a configuration for reporting channel state information, the configuration indicating a group of receive antenna ports for the UE to associate with a set of channel state information reports, receiving, from the UE, a channel state information report including channel state information associated with the group of receive antenna ports indicated by the configuration, and determining a set precoders associated with the group of receive antenna ports based on receiving the channel state information report.

An apparatus for wireless communications at a base station is described. The apparatus may include a processor, memory coupled with the processor, and instructions stored in the memory. The instructions may be executable by the processor to cause the apparatus to transmit, to a UE, a configuration for reporting channel state information, the configuration indicating a group of receive antenna ports for the UE to associate with a set of channel state information reports, receive, from the UE, a channel state information report including channel state information associated with the group of receive antenna ports indicated by the configuration, and determine a set precoders associated with the group of receive antenna ports based on receiving the channel state information report.

Another apparatus for wireless communications at a base station is described. The apparatus may include means for transmitting, to a UE, a configuration for reporting channel state information, the configuration indicating a group of receive antenna ports for the UE to associate with a set of channel state information reports, receiving, from the UE, a channel state information report including channel state information associated with the group of receive antenna ports indicated by the configuration, and determining a set precoders associated with the group of receive antenna ports based on receiving the channel state information report.

A non-transitory computer-readable medium storing code for wireless communications at a base station is described. The code may include instructions executable by a processor to transmit, to a UE, a configuration for reporting channel state information, the configuration indicating a group of receive antenna ports for the UE to associate with a set of channel state information reports, receive, from the UE, a channel state information report including channel state information associated with the group of receive antenna ports indicated by the configuration, and determine a set precoders associated with the group of receive antenna ports based on receiving the channel state information report.

Some examples of the method, apparatuses, and non-transitory computer-readable medium described herein may further include operations, features, means, or instructions for determining a set of repeated resources for a set of reference signals, transmitting an indication of the set of repeated resources in the configuration, and transmitting the set of reference signals via the set of repeated resources, where the channel state information may be based on the set of reference signals.

In some examples of the method, apparatuses, and non-transitory computer-readable medium described herein, the set of repeated resources may be within a slot.

In some examples of the method, apparatuses, and non-transitory computer-readable medium described herein, the set of repeated resources may be resources for channel state information reference signals.

Some examples of the method, apparatuses, and non-transitory computer-readable medium described herein may further include operations, features, means, or instructions for receiving a set of channel quality parameters in the channel state information report, each channel quality parameter corresponding to a respective receive antenna port of the group of receive antenna ports.

In some examples of the method, apparatuses, and non-transitory computer-readable medium described herein, each channel quality parameter may be corresponds to a respective repeated resource of a set of repeated resources for a set of reference signals.

Some examples of the method, apparatuses, and non-transitory computer-readable medium described herein may further include operations, features, means, or instructions for receiving a joint channel quality parameter that corresponds to the group of receive antenna ports in the channel state information report, receiving a set of differential channel quality parameters corresponding to respective receive antenna ports of the group of receive antenna ports in the channel state information report, where each differential channel quality parameter corresponds to a difference in channel quality with respect to the joint channel quality parameter, and determining the set precoders associated with the group of receive antenna ports based on the joint channel quality parameter and the set of differential channel quality parameters in the channel state information report.

In some examples of the method, apparatuses, and non-transitory computer-readable medium described herein, each differential channel quality parameter may be a function of a number of repetitions of one or more reference signals from the base station.

Some examples of the method, apparatuses, and non-transitory computer-readable medium described herein may further include operations, features, means, or instructions for receiving a common channel quality parameter that corresponds to the group of receive antenna ports, determining a common precoder for a set of reference signals based on the common channel quality parameter, and transmitting a reference signal to the UE using the common precoder.

Some examples of the method, apparatuses, and non-transitory computer-readable medium described herein may further include operations, features, means, or instructions for determining an association between a downlink transmission occasion and a receive antenna port of the group of receive antenna ports, and transmitting a set of reference signals to the UE based on the association.

Some examples of the method, apparatuses, and non-transitory computer-readable medium described herein may further include operations, features, means, or instructions for transmitting a first reference signal of the set of reference signals during a first transmission occasion using a first precoder based on the association, and transmitting a second reference signal of the set of reference signals during a second transmission occasion using a second precoder based on the association.

Some examples of the method, apparatuses, and non-transitory computer-readable medium described herein may further include operations, features, means, or instructions for receiving a common channel quality parameter in the channel state information report, the common channel quality parameter indicating a preference to disable receive antenna port switching at the UE.

Some examples of the method, apparatuses, and non-transitory computer-readable medium described herein may further include operations, features, means, or instructions for transmitting downlink control information from the base station, where the downlink control information includes an indication of precoder cycling for a set of downlink messages for the UE, and transmitting the set of downlink messages to the UE based on the precoder cycling.

DETAILED DESCRIPTION

Figure 1:
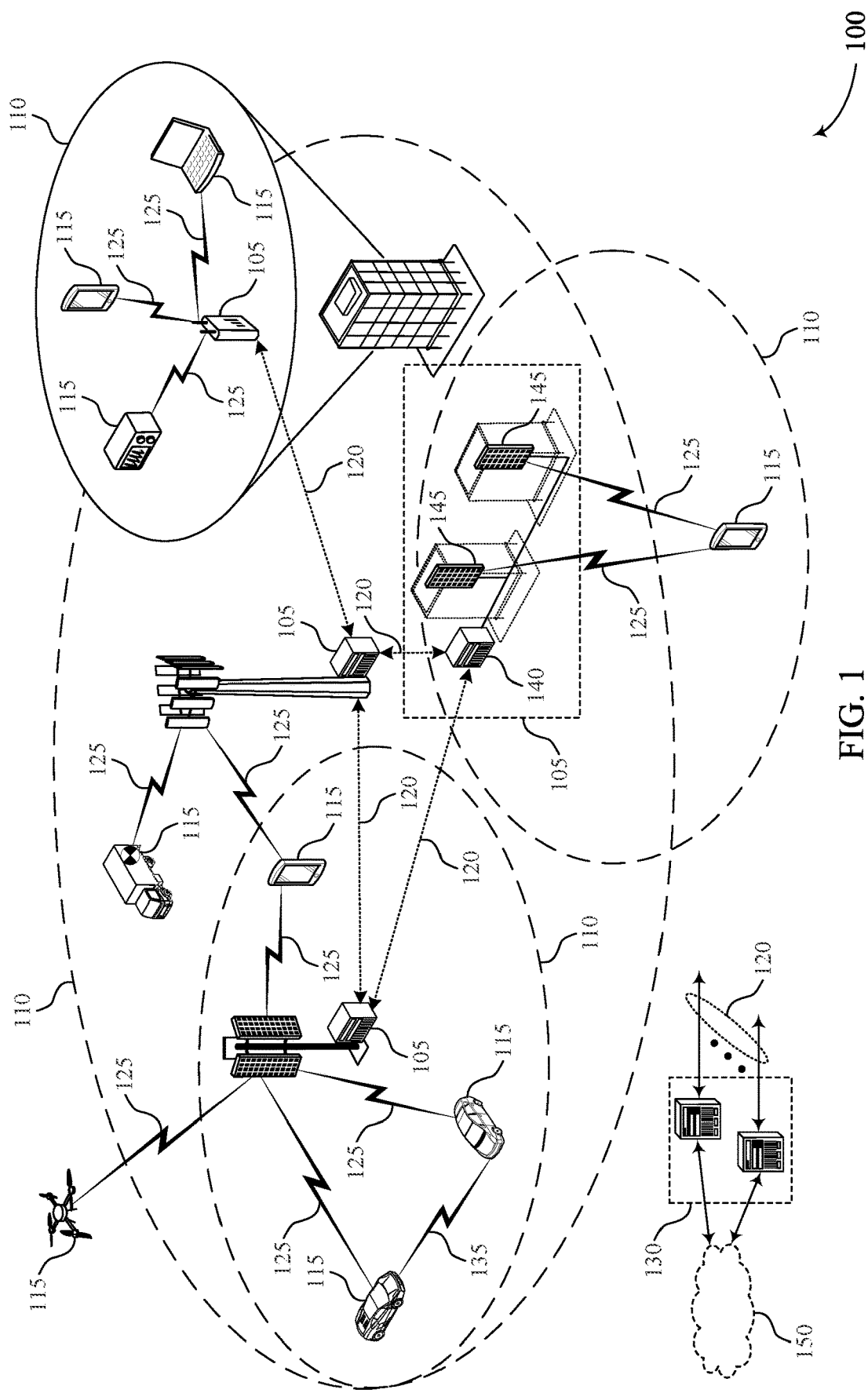
FIG. 1 illustrates an example of a wireless communications system that supports channel state feedback for receive antenna switching in accordance with aspects of the present disclosure.

Some wireless communications systems may support communications for a reduced capability UE. A reduced capability UE (e.g., a low tier UE, an NR-light UE, or other UE with limited capabilities) may operate with any of a reduced transmit power, a reduced number of transmit or receive antennas, a reduced transmission or reception bandwidth, a reduced computational complexity, among others. For example, a reduced capability UE may be a smart wearable device, an industrial sensor, a video surveillance device, etc.

In some examples, a reduce-capability UE may be configured with a reduced number of antennas. To improve communications for these reduced capability UEs, some wireless communications systems may use increased repetitions for downlink transmissions (e.g., a physical downlink control channel (PDCCH) and/or a physical downlink shared channel (PDSCH) transmissions, which may generally be referred to as a PDxCH transmission). For example, repetitions of the PDxCH may be used to compensate for the coverage loss associated with fewer receive antennas. A UE receiving the repeated PDxCH may switch between receive antennas to achieve increased spatial receive diversity.

The techniques described herein may provide enhanced configurations for UE receive antenna switching indications via a CSI report, which may reduce power consumption and conserve computational resources by improving reception of downlink transmissions.

Generally, the described techniques provide solutions to configure enhanced CSI reporting mechanisms which enable a UE to indicate a receive antenna port in a CSI report. For example, a base station may use beamforming and antenna-specific precoders to enhance communication with the UE. A UE may indicate in the CSI report that the associated CSI values correspond to a particular receive antenna port at the UE. Based on the indication of the receive antenna port in the CSI report, the base station may determine one or more precoders to use to communicate (e.g., transmit downlink transmission(s)) with the UE.

In some examples, the UE may transmit a CSI report that includes CSI as well as an indication of an associated receive antenna port. For example, the CSI report may include a receive antenna port index or other identifier. The base station may receive the CSI report including the indication and may use this information to determine a set of precoders to use for transmitting downlink messages (e.g., PDSCH or PDCCH). In some cases, a CSI report may not be received by the base station and the base station may also indicate (e.g., via downlink control information (DCI)) the receive antenna port for the UE to use to receive downlink communications.

According to some aspects, a base station may transmit a configuration to the UE, configuring the UE with a set of receive antenna ports for which the CSI reporting is to be performed. Based on the configuration, the UE may determine CSI for the set of receive antenna ports indicated by the configuration, and may include a joint CSI or common CSI value in the CSI report. The UE may also calculate differential CSI for each receive antenna port for the base station to determine precoders to use for downlink messages.

Aspects of the disclosure are initially described in the context of wireless communications systems. Aspects are then described with respect to CSI configurations and a process flow. Aspects of the disclosure are further illustrated by and described with reference to apparatus diagrams, system diagrams, and flowcharts that relate to channel state feedback for receive antenna switching.

FIG. 1 illustrates an example of a wireless communications system 100 that supports channel state feedback for receive antenna switching in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as OFDM or DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

A UE 115 may receive a set of reference signals from a base station 105 using one or more antenna ports of the UE 115. Based on receiving the set of reference signals, the UE 115 may generate CSI for the one or more antenna ports. In some cases, the UE 115 may generate CSI based on receiving a configuration indicating the set of antenna ports. The UE 115 may transmit, to a base station 105, a CSI report including the CSI information associated with the set of antenna ports and an indication of the associated antenna ports.

The base station 105 may receive the CSI report including the CSI information associated with the set of antenna ports and an indication of the associated antenna ports. In some cases, the CSI information and the indication may be based on a configuration generated and transmitted by the base station 105. Additionally, or alternatively, the base station 105 may transmit an indication of the set of antenna ports in DCI that schedules a downlink message for the base station 105 which may indicate the set of antenna ports which the UE 115 is to use for receiving the downlink message. The base station 105 may determine a set of precoders for downlink communications with the UE 115 based on the received CSI report or the DCI indication, or both. The set of precoders may be associated with the set of indicated antennas ports and communication using the associated precoder may enhance performance.

Figure 2:
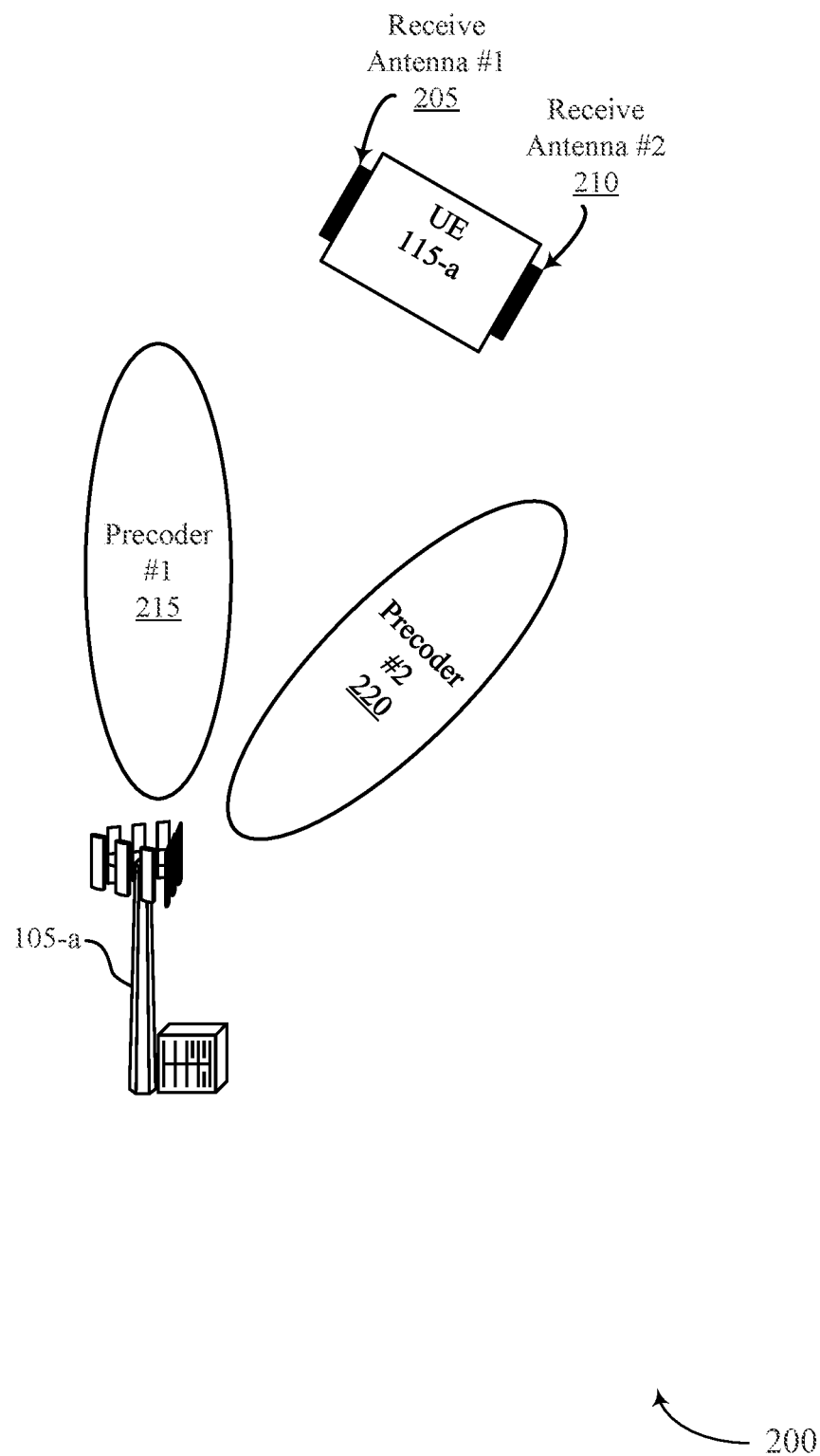
FIG. 2 illustrates an example of a wireless communications system that supports channel state feedback for receive antenna switching in accordance with aspects of the present disclosure.

FIG. 2 illustrates an example of a wireless communications system 200 that supports channel state feedback for receive antenna switching in accordance with aspects of the present disclosure. In some examples, wireless communications system 200 may implement aspects of wireless communications system 100. In some examples, wireless communications system 200 may implement aspects of wireless communications system 100. Wireless communications system 200 may include base station 105-a and UE 115-a, which may be examples of the corresponding devices described herein.

In some aspects, wireless communications system 200 may support communications with a reduced capability UE, such as UE 115-a. UE 115-a (e.g., a low tier UE, a NR-light UE, etc.) may operate with one or more of a reduced transmit power, a reduced number of transmit and/or receive antennas, a reduced transmit or receive bandwidth, or reduced computational complexity. For example, UE 115-a may be a smart wearable device, an industrial sensor, a video surveillance device, etc. Wireless communications system 100 may support increased repetitions for downlink transmissions (e.g., a PDCCH and/or a PDSCH transmissions, which may more generally be referred to as a PDxCH transmission). For example, UE 115-a receiving such repeated PDxCH may switch between receive antennas to achieve increased spatial receive diversity. The techniques described herein may provide for CSI reporting mechanisms for UE receive antenna ports, such that receive antenna switching may be enabled based on CSI-reports. However, it is to be understood that the described techniques are not limited to a reduced capability UE, but may be implemented by an advanced UE operating in a NR, NR-light, 5G, and the like, wireless network. Accordingly, UE 115-*a* may be an example of a reduced capability UE, or may be an example of an advanced or higher complexity UE implementing the described techniques.

Wireless communications system 200 may utilize time domain bundling. For example, base station 105-*a* may configure a pattern for bundling time domain demodulation reference signals (DMRSs). UE 115-*a* may assume that the same spatial precoding is used for the DMRSs that shares the same frequency domain resource allocation and different time domain resource allocations within the same time domain bundle. The UE 115-*a* may carry out joint channel estimation using the time domain bundled DMRS, which may improve channel estimation for the UE 115-*a* (e.g., in cases where UE 115-*a* is experiencing a low signal-to-noise-ratio (SNR)).

UE 115-*a* may be configured with a limited number of receive antennas. By way of non-limiting example, UE 115-*a* is configured with two receive antennas, which includes a first receive antenna port 205 and a second receive antenna port 210. Each receive antenna of UE 115-*a* may be associated with a corresponding receive antenna port, such that the receive antenna port (or receive antenna identifier) associated with the first receive antenna port 205 is different from the receive antenna port associated with the second receive antenna port 210. Although two receive antennas may be available at the UE 115-*a*, the UE 115-*a* may be configured with one receive chain (e.g., to reduce cost) and utilize an antenna switcher to allow one receive antenna to be connected with the receive chain at a time. When the UE 115-*a* receives downlink communications from the base station 105-*a*, the UE 115-*a* can switch between the receive antennas in order to obtain spatial receive diversity. For example, a first downlink communication (e.g., reference signals, control information, data, and the like) may be received by the first receive antenna port 205, while subsequent downlink communications may be received by the second receive antenna port 210, or vice versa. This technique may improve reception of the downlink transmission such that the total number of repetitions can be reduced using the antenna switch implementation as compared to using a single receive antenna. Base station 105-*a* may configure the downlink transmission for time domain DMRS bundling for the repetitions associated with the same receive antenna.

If closed-looped precoding is implemented by base station 105-*a* (e.g., based on precoders determined by a sounding reference signals (SRS) from UE 115-*a*), the precoder for the different receive antennas of the UE 115-*a* may be different. For example, base station 105-*a* may transmit one or more repetitions of the downlink transmission to UE 115-*a* using a first precoder 215 and other repetitions using a second precoder 220. In some cases, the precoder used by base station 105-*a* may be associated with a given transmit antenna or transmit beam of base station 105-*a*. For example, the first precoder 215 may correspond to a first transmit antenna or transmit beam of base station 105-*a* and the second precoder 220 may correspond to a second transmit antenna or transmit beam of base station 105-*a*. In the example illustrated in FIG. 2, the first receive antenna port 205 of UE 115-*a* may be configured or otherwise oriented such that UE 115-*a* uses the first receive antenna 205 to receive transmissions from base station 105-*a* using the first precoder 215 (e.g., the first receive antenna port 205 may have a higher likelihood of successfully receiving a transmission from the base station 105-*a* using the first precoder 215). Further, the second receive antenna port 210 of UE 115-*a* may be configured or otherwise oriented such that UE 115-*a* uses the second receive antenna port 210 to receive transmissions from base station 105-*a* using the second precoder 220 (e.g., the second receive antenna port 210 may have a higher likelihood of successfully receiving a transmission from the base station 105-*a* using the second precoder 220).

While utilizing these techniques may reduce the number of repetitions of a downlink transmission, an indication of a receive antenna used by UE 115-*a* may be transmitted by the UE 115-*a* in order for base station 105-*a* to determine the precoder(s) to transmit the PDxCH repetitions.

Accordingly, aspects of the described techniques provide mechanisms for configuring or indicating the receive antennas of UE 115-*a* in order for base station 105-*a* to select the precoder(s) to transmit the PDxCH repetitions. In some examples, the indication of the receive antenna port may be based on information included in a CSI report transmitted from the UE 115-*a* including a receive antenna port index or other identifier.

In some examples, UE 115-*a* may include information associated with one or more receive antenna ports in a CSI report. The CSI report may include CSI values that may be determined based on the reported receive antenna port. In some cases, the receive antenna port may be based on a receive antenna port index. In some example, the base station 105-*a* may use the reported receive antenna ports and the associated CSI values to determine precoders for the PDxCH repetitions associated with the reported receive antenna ports.

In some examples, the UE 115-*a* may transmit a CSI report that includes CSI values as well as a receive antenna port indication (e.g., receive antenna port index) of one or more receive antenna ports (e.g., first receive antenna port 205, second receive antenna port 210). For example, the CSI report may include a receive antenna port index or other identifier associated with first receive antenna port 205 or second receive antenna port 210, or both. The base station 105-*a* may receive the CSI report including the receive antenna port indication and may use the receive antenna port information to determine the precoders to use for transmitting downlink messages (e.g., PDSCH or PDCCH).

In some examples, UE 115-*a* may transmit a CSI report including a receive antenna port index corresponding to first receive antenna port 205 and base station 105-*a* may determine to use first precoder 215 to transmit one or more PDxCH repetitions. In some examples, UE 115-*a* may transmit a CSI report including a receive antenna port index corresponding to second receive antenna port 210 and base station 105-*a* may determine to use second precoder 220 to transmit one or more PDxCH repetitions. Additionally or alternatively, UE 115-*a* may transmit CSI including a set of receive antenna port indexes and the base station 105-*a* may determine to use one or more precoders for the PDxCH repetitions.

In some cases, a CSI report may not be received by the base station and the base station may also indicate (e.g., via DCI) the receive antenna port for the UE to receive downlink communications. For example, UE 115-*a* may transmit CSI including one or more receive antenna port indexes but the base station 105-*a* may not receive the CSI report and may transmit using a precoder that is not associated with the set of receive antennas. The base station 105-*a* may include an indication of the receive antenna port associated with the precoder used for transmission in a DCI message, such that there is not mismatch between the precoder and the enabled receive antenna at the UE 115-a.

In some cases, the indication of the receive antenna port associated with the precoder may be included in a transmission configuration indicator (TCI) in the DCI. The TCI may include additional information. For example, the TCI may indicate a TCI state (e.g., including information such as quasi-co location relationships between downlink reference signals and PDSCH DMRS ports). The TCI state may be linked with a CSI-RS resource and the UE 115-a may link the TCI state to the CSI-RS resource. However, the CSI-RS resource may be associated with a previously transmitted CSI report which may have included a receive antenna port indication. In such cases, the indicated TCI state may already be associated with the receive antenna port and may be reused in the TCI indicator without additional payload.

In some examples, base station 105-a may transmit a configuration to the UE 115-a, configuring the UE with a set of receive antenna ports for which the CSI reporting is to be performed. For example, base station 105-a may transmit a configuration to UE 115-a indicating one or more of first receive antenna port 205 and second receive antenna port 210. Based on the configuration, the UE 115-a may determine CSI for the indicated receive antennas, and may include a joint CSI or common CSI value in the CSI report transmitted to base station 105-a. The UE 115-a may also calculate differential CSI for each indicated receive antenna port for the base station 105-a to determine precoders for transmitting PDxCH. Accordingly, receive antenna port switching at the UE 115-a may be based on receive port identifiers indicated in the CSI report or DCI, or both.

Figure 3A:
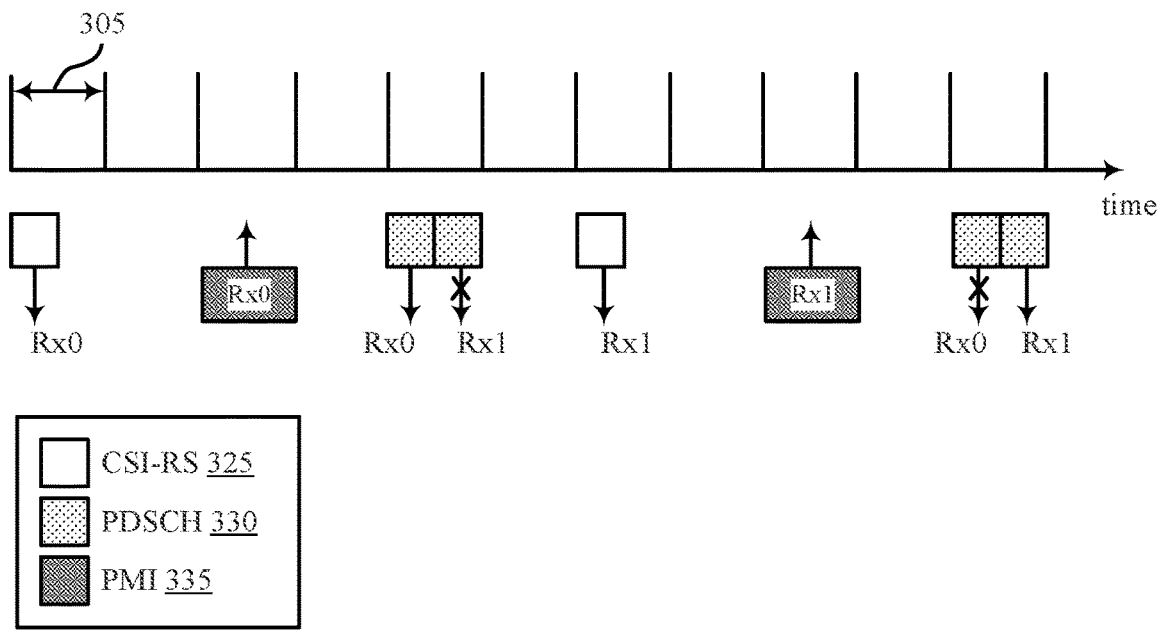
FIGS. 3A and 3B illustrate timelines that support channel state feedback for receive antenna switching in accordance with aspects of the present disclosure.
Figure 3B:
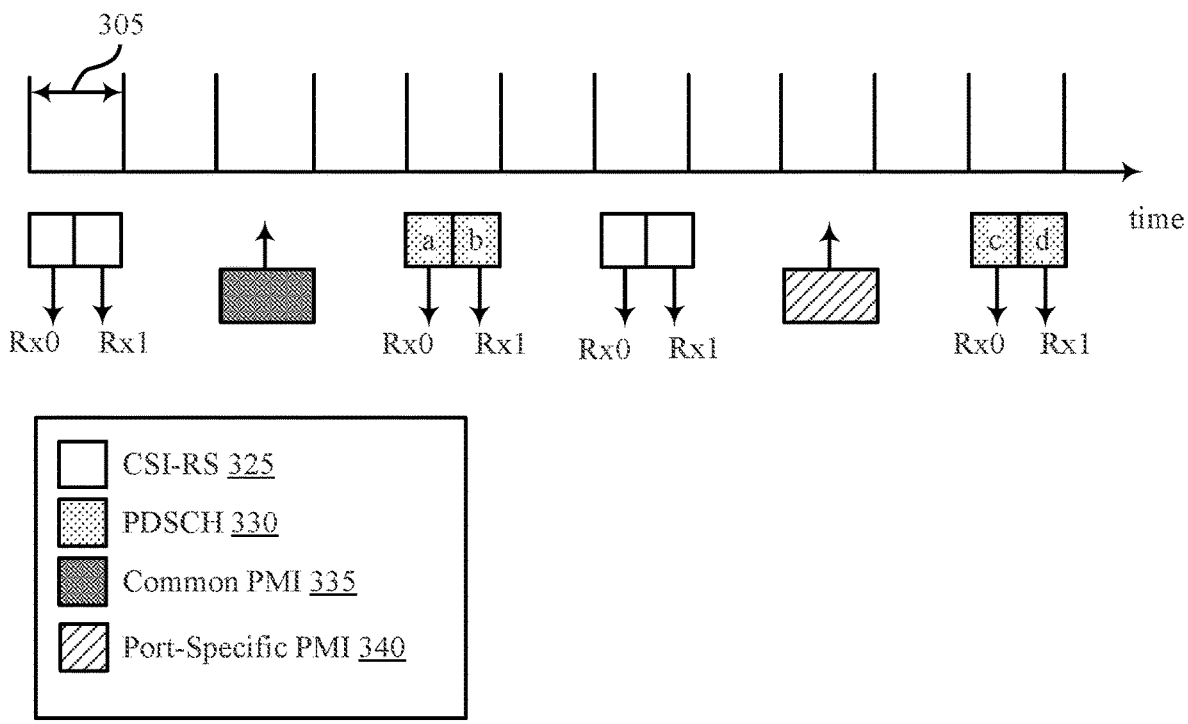

FIGS. 3A and 3B illustrate timelines 300-a and 300-b that support channel state feedback for receive antenna switching in accordance with aspects of the present disclosure.

FIG. 3A illustrates a first example of a timeline 300-a for UE antenna port switching. FIG. 3A includes multiple slots 305, CSI-RSs 325, PDSCH 330 and PMI 335. A base station (e.g., a base station as described with reference to FIGS. 1 and 2) may transmit a CSI-RS 325 to a UE (e.g., a UE as described with reference to FIGS. 1 and 2) that corresponds to a first receive antenna port of the UE (e.g., Rx0). In some examples, the CSI-RS resources may be TDM resources. The UE may receive the CSI-RS 325 and may transmit a CSI report, including for example PMI 335, associated with Rx0 to the base station. In such examples, the base station may receive the CSI and may transmit PDSCH in a slot 305 using a precoder associated with the PMI 335 for Rx0. In such cases, the base station may transmit a single PDSCH within the slot 305 and may not transmit a second PDSCH using a second precoder associated with a second receive antenna port (e.g., Rx1).

However, if the UE determines to switch to receiving PDSCH with Rx1, the process may repeat for Rx1. For example, the base station may transmit a CSI-RS 325 to a UE that corresponds to Rx1. The UE may receive the CSI-RS 325 and may transmit a CSI report, for example PMI 335, associated with Rx1 to the base station. In such examples, the base station may receive the CSI and may transmit PDSCH in a second slot 305 using a precoder associated with the PMI 335 for Rx1. In such cases, the base station may transmit a single PDSCH within the slot 305 and may not transmit a second PDSCH using the first precoder associated with Rx0.

The described techniques may enable receive antenna switching at a UE for single transmission PDSCH. For example, the UE may have two receive antennas and may use one of the two at a time to receive the downlink signal. In some cases, there may be a number of repeated PDSCH but the base station may be able to indicate a single receive antenna port to the UE in CSI-RS resource and may not be able to support multiple PDSCH repetitions. In such cases, a UE may be configured with repeated CSI-RS resources.

FIG. 3B illustrates a second example of a timeline 300-b for UE antenna port switching. For example, FIG. 3B includes multiple slots 305, CSI-RS 325, PDSCH 330 and Common PMI 335 and port-specific PMI 340.

A base station (e.g., a base station as described with reference to FIGS. 1 and 2) may transmit a plurality (e.g., two) of CSI-RS 325 to a UE (e.g., a UE as described with reference to FIGS. 1 and 2) that correspond to a first receive antenna port of the UE (e.g., Rx0) and a second receive antenna port (e.g., Rx1). The plurality of CSI-RS resources may be transmitted within a slot 305. In some examples, the CSI-RS 325 may be TDM resources. The UE may receive the CSI-RS 325 and may transmit a CSI report, for example common PMI 335, associated with a set of UE receive antenna ports (e.g., Rx0 and Rx1) to the base station. In some cases, the CSI report may include channel quality information (CQI) associated with the set of UE receive antenna ports (e.g., Rx0 and Rx1). In such examples, the base station may receive the common PMI 335 and may transmit multiple PDSCH 330 in a slot 305 using a precoder associated with the common PMI 335 for both Rx0 and Rx1. In such cases, the common precoder may be associated with both Rx0 and Rx1 and may be used to transmit a first PDSCH 330-a associated with Rx 0 and may also be used to transmit a second PDSCH 330-b associated with Rx1.

In some examples, when the UE transmits the CSI report including the common PMI 335, the UE may indicate a disabling of receive antenna switching at the UE. In such cases, the base station may receive the common PMI 335 and may include an indication within the DCI indicating whether the precoders would be cycled over time or if a common precoder will be used. The indication may include a one bit indication within the DCI. In some cases, the bit may be set to zero and may indicate that the precoders would not be cycled over time. In such cases, the UE may determine whether to switch receive antennas independently. In some cases, the bit may be set to one and may indicate that the base station has determined that receive antenna switching should be performed at the UE.

In some examples, the base station may transmit a plurality (e.g., two) of CSI-RS resources 325 to the UE that correspond to a first receive antenna port of the UE (e.g., Rx0) and a second receive antenna port (e.g., Rx1). The plurality of CSI-RS resources may be transmitted within a slot 305. In some examples, the CSI-RS resources 325 may be TDM resources. The UE may receive the CSI-RS resource 325 and may transmit a CSI report, for example port-specific PMI 340, that includes a plurality of PMIs, each associated with one of the set of UE receive antenna ports (e.g., Rx0 and Rx1) to the base station. In some cases, the CSI report may include a plurality of CQI, each associated with the set of UE receive antenna ports (e.g., Rx0 and Rx1). In such examples, the base station may receive the port specific PMI 340 (e.g., including a port-specific PMI for each of Rx0 and Rx1) and may transmit multiple PDSCH 330 in a slot 305 using port-specific precoders associated with the port-specific PMI 340 for each of Rx0 and Rx1. In such cases, the port-specific precoders may be individually associated with one of Rx0 and Rx1 and may be used to transmit a first PDSCH 330-c associated with Rx 0 and a second PDSCH 330-d associated with Rx1 respectively.

Other CSI parameters may be generated by the UE, such as channel quality indicator (CQI), rank indicator (RI), or PMI for a set of receive antenna ports used by the UE for generating the CSI. Based on the CSI parameters included in the CSI report, the base station may determine one or more precoders to use for transmitting one or more downlink message to the base station. In some cases, the base station may configure a UE with a given set of receive antenna ports that the UE is to use to generate one or more CSI parameters. Additionally, or alternatively, the base station may indicate a receive antenna port for the UE to use for receiving a downlink message, such as within DCI scheduling a PDSCH for the UE, and the UE may use the indicated receive antenna port for receiving the downlink message.

Figure 4:
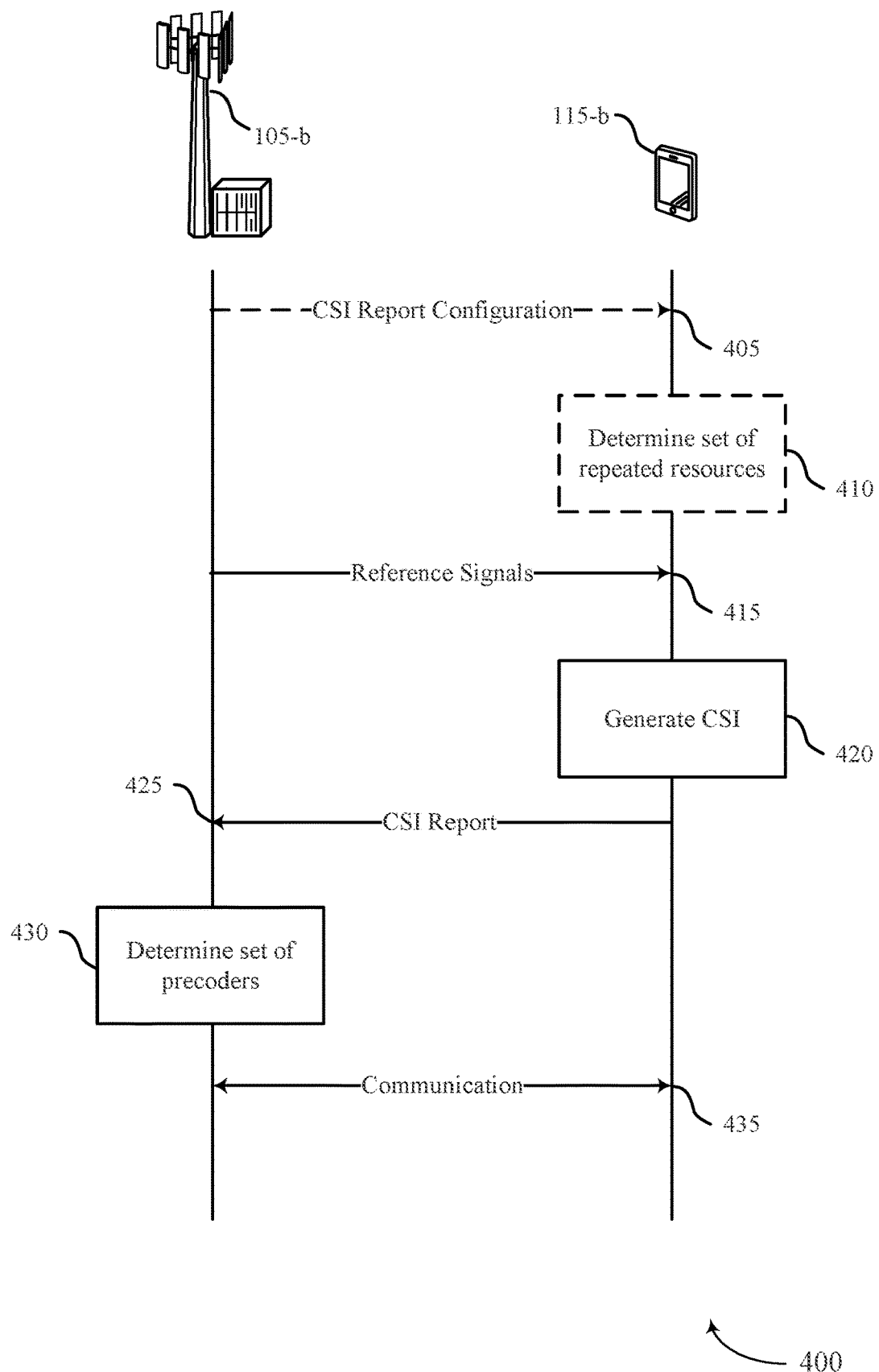
FIG. 4 illustrates an example of a process flow that supports channel state feedback for receive antenna switching in accordance with aspects of the present disclosure.

FIG. 4 illustrates an example of a process flow 400 that supports channel state feedback for receive antenna switching in accordance with aspects of the present disclosure. In some examples, process flow 400 may implement aspects of wireless communications system 100. In some examples, process 400 may implement aspects of wireless communications systems 100 or 200, or timelines 300-a and 300-b. Aspects of process 400 may be implemented by base station 105-b or UE 115-b, which may be examples of corresponding devices described herein.

In the following description of the process flow 400, the operations between the base station 105 d and the UE 115 d may be performed in a different orders or at different times than as shown. Some operations may be omitted from the process flow 400, and other operations may be added to the process flow 400 without departing from the scope of the present disclosure. As discussed above, aspects of the described techniques provide various mechanisms for CSI reporting mechanisms for receive antenna port switching at UE 115-b.

In some examples, at 405, the base station 105-b may transmit and the UE 115-b may receive a CSI report configuration. The CSI report configuration may include a configuration for reporting CSI and may indicate a set of receive antenna ports (e.g., one or more receive antenna ports). Additionally or alternatively, the base station 105-b may determine a set of repeated resources for transmitting a set of reference signals (e.g., one or more reference signals) and may include an indication of the set of repeated resources in the CSI report configuration. The CSI report configuration may configure the UE 115-b with a number of receive antenna ports or may specify which receive antenna ports to use for CSI reporting. For example, the CSI report configuration may include an indication in DCI that explicitly indicates the receive antenna port. The UE 115-b may associate the set of receive antenna ports with CSI reports based on the received configuration.

In some examples, at 410 the UE 115-b may determine a set of repeated resources for receiving the set of reference signals based on receiving the CSI report configuration from the base station 105-b. In some cases, the set of repeated resources includes CSI-RS resources which may be repeated within a slot. At 415, the base station 105-b may transmit and the UE 115-b may receive the set of reference signals. In some cases, the set of reference signals may be received on the set of repeated resources. However, in some examples, the base station 105-b may not transmit the CSI report configuration to the UE 115-b and thus the set of repeated resources may not be indicated to the UE 115-b.

At 420, the UE 115-b may generate CSI based on receiving the set of reference signals from the base station 105-b. In some cases, the CSI report may include an explicit indication of the set of receive antenna ports (e.g., a receive antenna port index) to indicate that the CSI report is associated with the set of receive antenna ports. The CSI report may also include CSI information associated with the indicated set of receive antenna ports. In some cases, generating the CSI report includes determining channel state parameters (e.g., CQI) for the received reference signals. Each of the channel quality parameters may be associated with the set of receive antenna ports. The UE 115-b may include the channel quality parameters in the CSI report. At 425, the UE 115-b may transmit and the base station 105-b may receive the CSI reports including the channel quality parameters, the receive antenna port information among other information.

At 430, based on receiving the CSI Report, the base station 105-b may determine a set of precoders corresponding to the indicated receive antenna ports of the UE 115-b and at 435, may communicate with the UE 115-b using the set of precoders. For example, the base station 105-b may transmit PDxCH to the UE 115-b using the set of precoders. In some cases, the UE 115-b may transmit the CSI report but it may not be received by the base station 105-b. In such cases, the base station may determine the set of precoders without indication from the UE 115-b and may indicate the determined precoders in DCI used to schedule the PDxCH.

Figure 5:
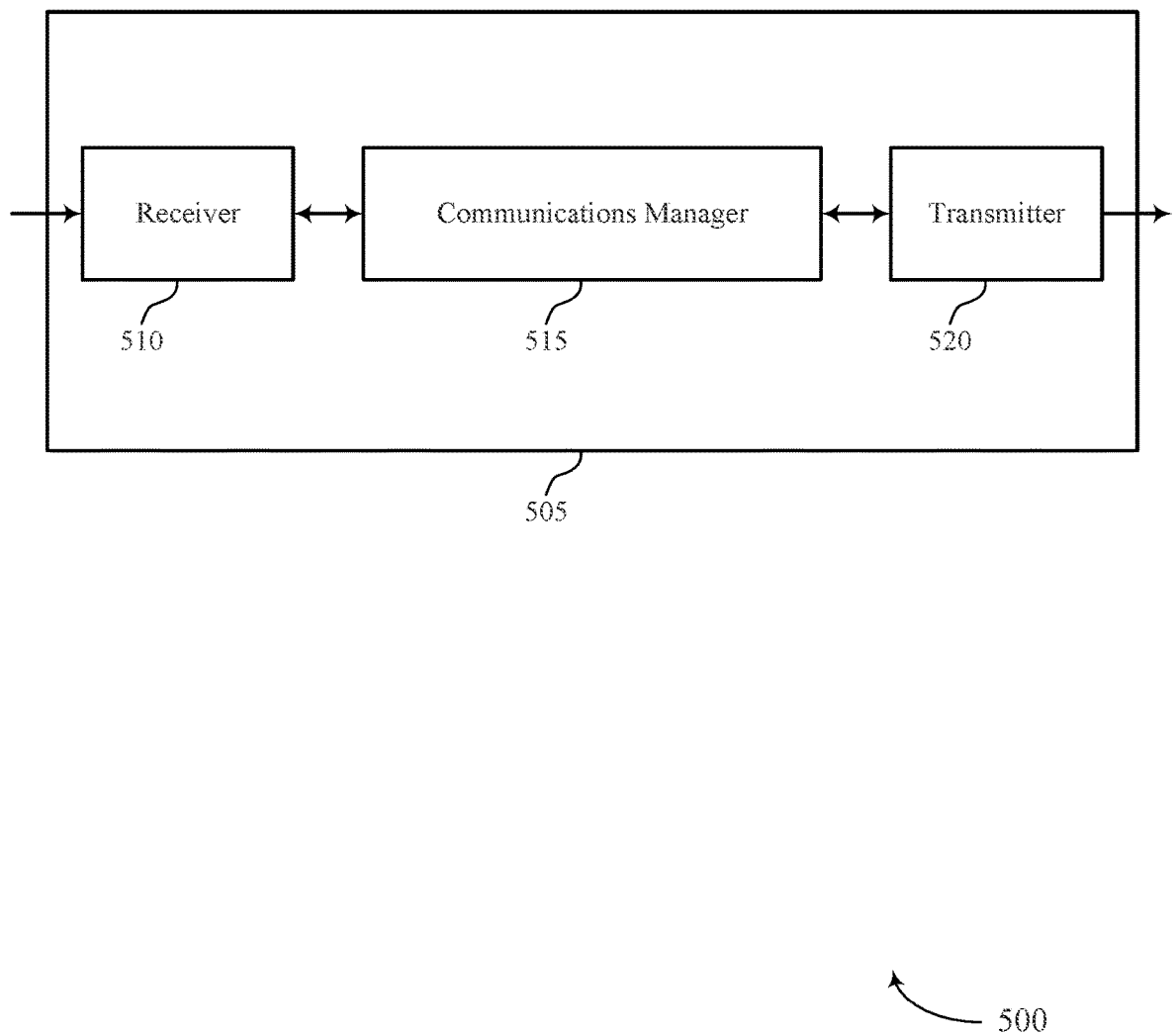
FIGS. 5 and 6 show diagrams of devices that support channel state feedback for receive antenna switching in accordance with aspects of the present disclosure.

FIG. 5 shows a diagram 500 of a device 505 that supports channel state feedback for receive antenna switching in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to channel state feedback for receive antenna switching, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive a reference signal from a base station, generate channel state information associated with a set of UE receive antenna ports based on the reference signal received from the base station, and transmit a channel state information report to the base station, the channel state information report including the channel state information associated with the set of UE receive antenna ports and an indication of the set of UE receive antenna ports. The communications manager 515 may also receive, from a base station, a configuration for reporting channel state information by the UE, the configuration indicating a group of receive antenna ports for the UE to associate with channel state information reports, generate channel state information associated with the group of receive antenna ports indicated by the configuration, and transmit, to the base station, a channel state information report including the channel state information associated with the group of receive antenna ports indicated by the configuration. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its subcomponents may be executed by a general-purpose processor, a DSP (digital signal processor), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some examples, the communications manager 515 may be implemented as an integrated circuit or chipset for a mobile device modem, and the receiver 510 and transmitter 520 may be implemented as analog components (e.g., amplifiers, filters, antennas) coupled with the mobile device modem to enable wireless transmission and reception over one or more bands.

The communications manager 515 as described herein may be implemented to realize one or more potential advantages. One implementation may allow the device 505 to provide receive antenna port information to a base station within channel state feedback, such as a CSI report. Additionally, or alternatively, the device 505 may be configured with a set of receive antenna ports to use for generating CSI or may be indicated a given receive antenna port to use for receiving downlink transmissions. Such techniques may enable the device 505, which may be a reduced complexity device, to receive downlink transmissions from a base station using precoders determined by the base station based on the receive antenna port information from the device 505 or the CSI report from the device 505.

As such, the device 505 may increase the likelihood of successfully receiving one or more downlink transmission (e.g., repetitions of a downlink message) and, accordingly, may communicate with a greater likelihood of successful communications. In some examples, based on a greater likelihood of successful communications, the device 505 may more efficiently power a processor or one or more processing units associated with CSI reporting transmitting and receiving communications, which may enable the device 505 to save power and increase battery life.

Figure 6:
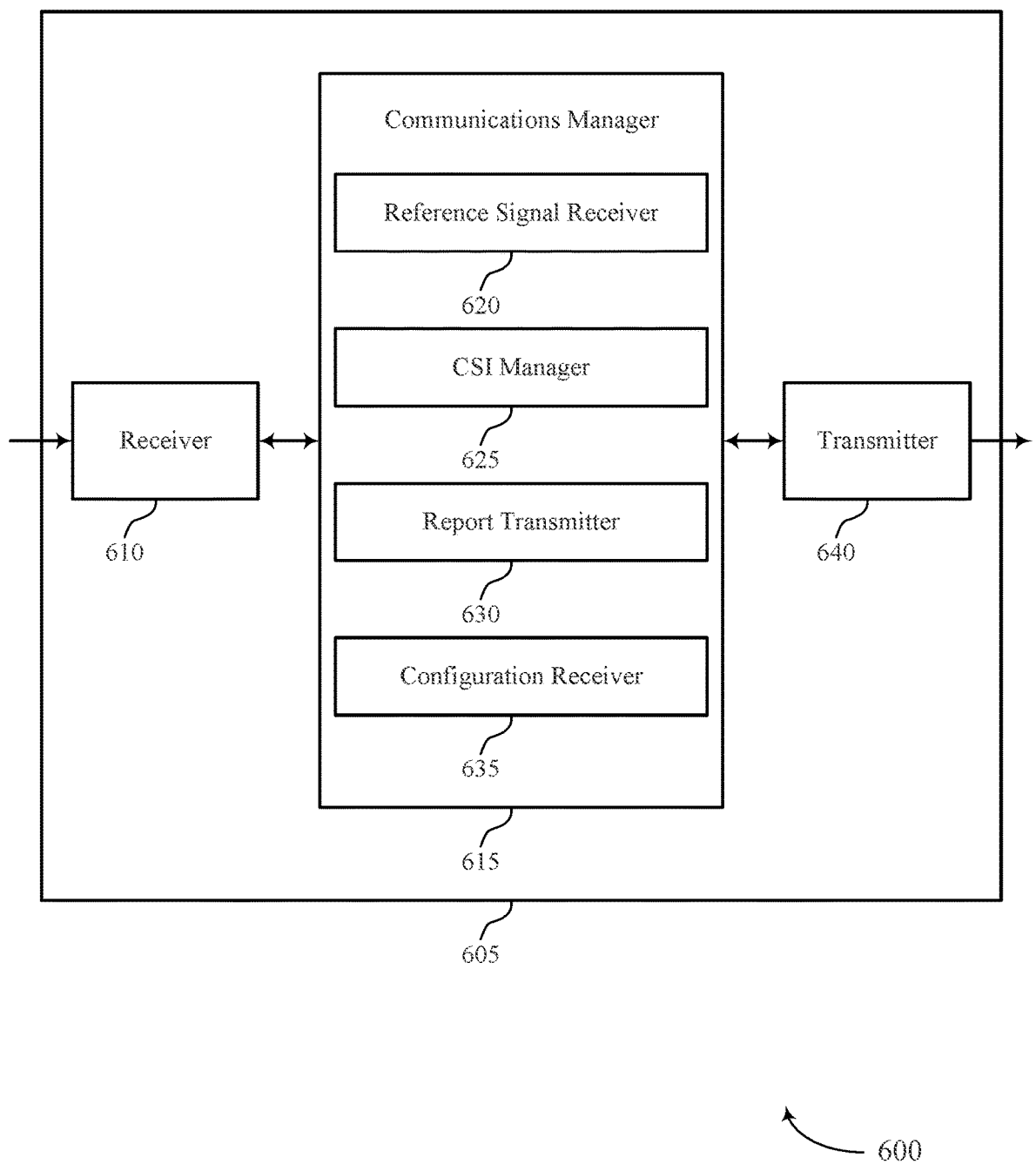

FIG. 6 shows a diagram 600 of a device 605 that supports channel state feedback for receive antenna switching in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to channel state feedback for receive antenna switching, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a reference signal receiver 620, a CSI manager 625, a report transmitter 630, and a configuration receiver 635. The communications manager 615 may be an example of aspects of the communications manager 810 described herein.

The reference signal receiver 620 may receive a reference signal from a base station.

The CSI manager 625 may generate channel state information associated with a set of UE receive antenna ports based on the reference signal received from the base station.

The report transmitter 630 may transmit a channel state information report to the base station, the channel state information report including the channel state information associated with the set of UE receive antenna ports and an indication of the set of UE receive antenna ports.

The configuration receiver 635 may receive, from a base station, a configuration for reporting channel state information by the UE, the configuration indicating a group of receive antenna ports for the UE to associate with channel state information reports.

The CSI manager 625 may generate channel state information associated with the group of receive antenna ports indicated by the configuration.

The report transmitter 630 may transmit, to the base station, a channel state information report including the channel state information associated with the group of receive antenna ports indicated by the configuration.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
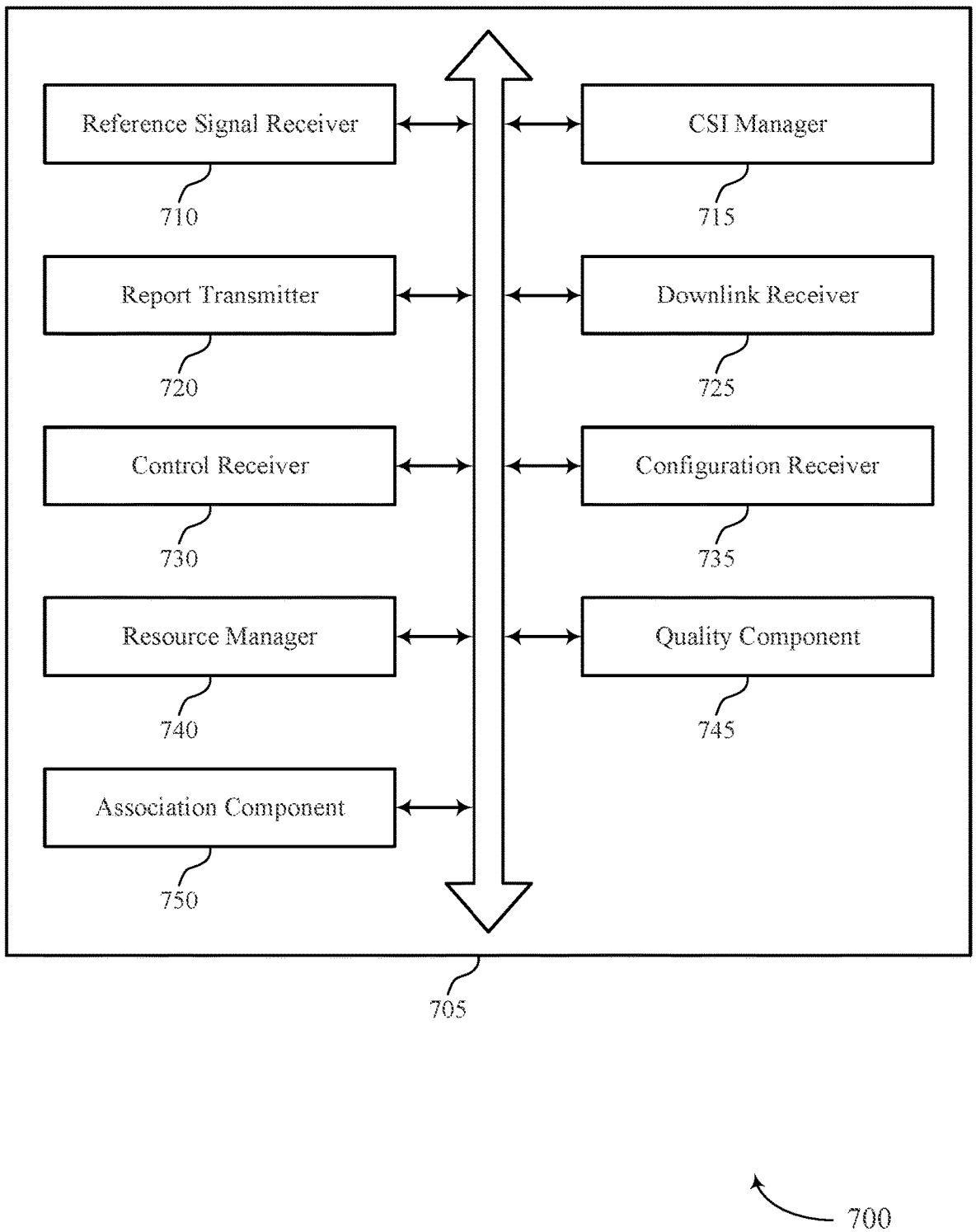
FIG. 7 shows a diagram of a communications manager that supports channel state feedback for receive antenna switching in accordance with aspects of the present disclosure.

FIG. 7 shows a diagram 700 of a communications manager 705 that supports channel state feedback for receive antenna switching in accordance with aspects of the present disclosure. The communications manager 705 may be an example of aspects of a communications manager 515, a communications manager 615, or a communications manager 810 described herein. The communications manager 705 may include a reference signal receiver 710, a CSI manager 715, a report transmitter 720, a downlink receiver 725, a control receiver 730, a configuration receiver 735, a resource manager 740, a quality component 745, and an association component 750. Each of these modules may communicate, directly or indirectly, with one another (e.g., via one or more buses).

The reference signal receiver 710 may receive a reference signal from a base station.

In some examples, the reference signal receiver 710 may receive, from the base station, the reference signal via the set of repeated resources using the group of receive antenna ports, where the channel state information is generated based on the reference signal received from the base station.

In some examples, the reference signal receiver 710 may receive multiple reference signals based on a common precoder corresponding to the common channel quality parameter and the group of receive antenna ports.

In some examples, the reference signal receiver 710 may receive a set of reference signals from the base station based on the association.

In some examples, the reference signal receiver 710 may receive a first reference signal of the reference signal during a first transmission occasion based on a first receive antenna port of the group based on the association.

In some examples, the reference signal receiver 710 may receive a second reference signal of the reference signal during a second transmission occasion based on a second receive antenna port of the group based on the association.

In some examples, the reference signal receiver 710 may receive a reference signal from the base station.

The CSI manager 715 may generate channel state information associated with a set of UE receive antenna ports based on the reference signal received from the base station.

In some examples, the CSI manager 715 may generate channel state information associated with the group of receive antenna ports indicated by the configuration.

In some examples, determining a set of channel quality parameters for the reference signal using the set of UE receive antenna ports, where the channel state information report includes the set of channel quality parameters.

In some examples, the CSI manager 715 may determine one or more channel quality parameters for the group of receive antenna ports, where the one or more channel quality parameters include a PMI or a CQI.

In some examples, the CSI manager 715 may determine a set of channel quality parameters, each channel quality parameter corresponding to a respective receive antenna port of the group of receive antenna ports.

In some examples, the CSI manager 715 may generate the channel state information based on the reference signal.

In some cases, each channel quality parameter of the set of channel quality parameters is associated with the set of UE receive antenna ports indicated by the channel state information report.

In some cases, each channel quality parameter corresponds to a respective repeated resource of a set of repeated resources for a set of reference signals.

The report transmitter 720 may transmit a channel state information report to the base station, the channel state information report including the channel state information associated with the set of UE receive antenna ports and an indication of the set of UE receive antenna ports.

In some examples, the report transmitter 720 may transmit, to the base station, a channel state information report including the channel state information associated with the group of receive antenna ports indicated by the configuration.

In some examples, the report transmitter 720 may transmit the set of channel quality parameters in the channel state information report.

In some examples, the report transmitter 720 may transmit the joint channel quality parameter and the set of differential channel quality parameters in the channel state information report.

In some examples, the report transmitter 720 may transmit the common channel quality parameter in the channel state information report.

In some examples, the report transmitter 720 may transmit a common channel quality parameter in the channel state information report, the common channel quality parameter indicating a preference to disable receive antenna port switching at the UE.

In some cases, the indication of the set of UE receive antenna ports includes a set of receive antenna port indexes corresponding to the set of UE receive antenna ports.

The configuration receiver 735 may receive, from a base station, a configuration for reporting channel state information by the UE, the configuration indicating a group of receive antenna ports for the UE to associate with channel state information reports.

The downlink receiver 725 may receive a downlink message from the base station based on one or more precoders associated with the indication of the set of UE receive antenna ports.

In some examples, the downlink receiver 725 may receive multiple repetitions of a downlink message from the base station based on one or more precoders associated with the indication of the set of UE receive antenna ports.

In some examples, the downlink receiver 725 may receive the downlink message using the receive antenna port indicated in the control channel message.

In some examples, the downlink receiver 725 may receive the set of downlink messages using a set of receive antenna ports of the group of antenna ports based on the precoder cycling.

The control receiver 730 may receive a control channel message including scheduling information for a downlink message for the UE and an indication of a receive antenna port for the UE to use for receiving the downlink message.

In some examples, the control receiver 730 may receive an indication of an association between a resource for the reference signal and the receive antenna port.

In some examples, the control receiver 730 may receive the indication via a transmission configuration indicator.

In some examples, the control receiver 730 may receive the indication via downlink control information.

In some examples, receiving downlink control information from the base station, where the downlink control information includes an indication of precoder cycling for a set of downlink messages from the base station.

The resource manager 740 may determine a set of repeated resources for a reference signal from the base station based on the configuration.

In some cases, the set of repeated resources are within a slot.

In some cases, the set of repeated resources are resources for channel state information reference signals.

The quality component 745 may determine a joint channel quality parameter that corresponds to the group of receive antenna ports.

In some examples, the quality component 745 may determine a set of differential channel quality parameters corresponding to respective receive antenna ports of the group of antenna ports, where each differential channel quality parameter corresponds to a difference in channel quality with respect to the joint channel quality parameter.

In some examples, the quality component 745 may determine a common channel quality parameter that corresponds to the group of receive antenna ports.

In some cases, each differential channel quality parameter is a function of a number of repetitions of one or more reference signals from the base station.

The association component 750 may determine an association between a downlink transmission occasion and a receive antenna port of the group of receive antenna ports.

Figure 8:
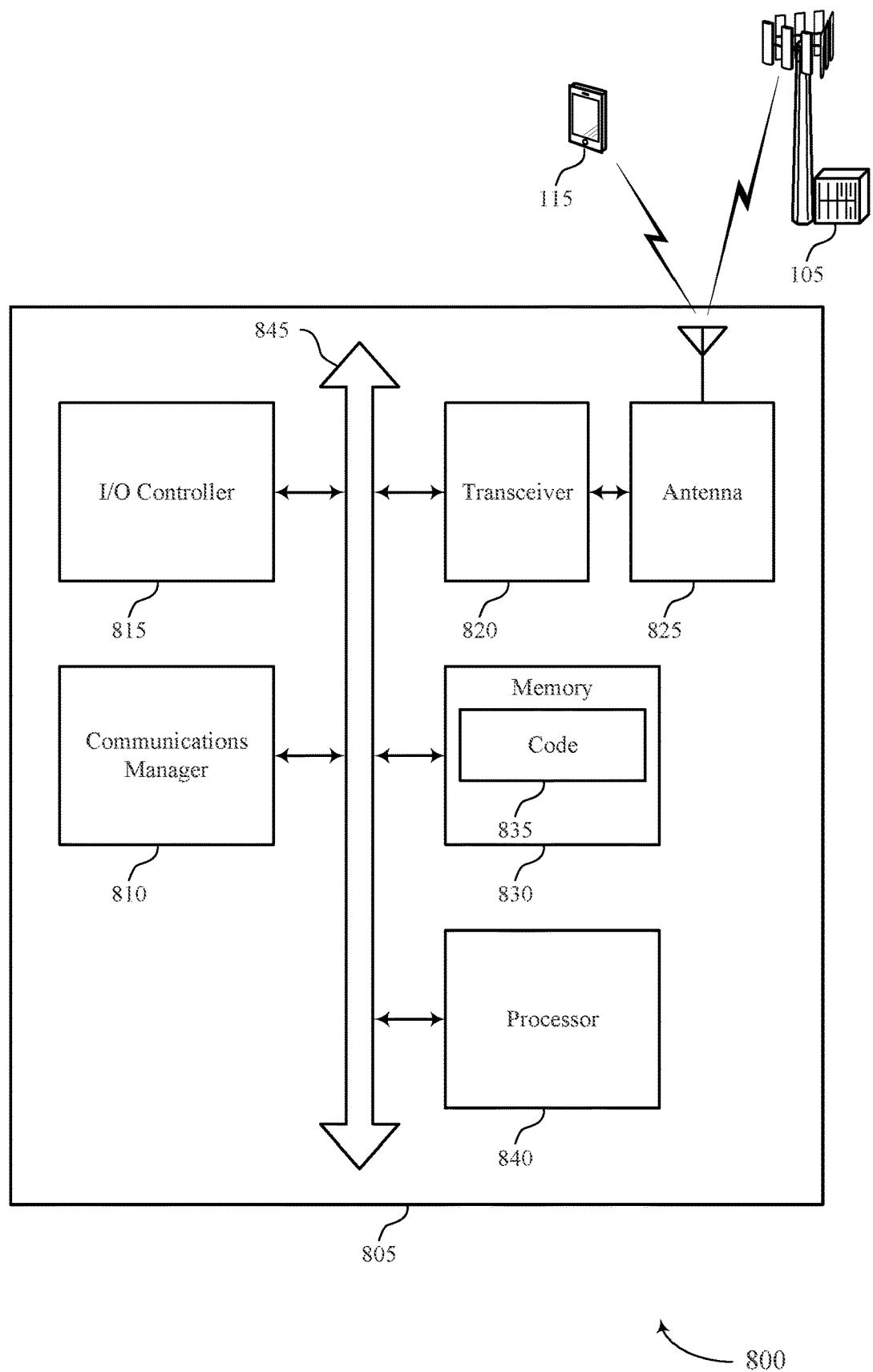
FIG. 8 shows a diagram of a system including a device that supports channel state feedback for receive antenna switching in accordance with aspects of the present disclosure.

FIG. 8 shows a diagram of a system 800 including a device 805 that supports channel state feedback for receive antenna switching in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive a reference signal from a base station, generate channel state information associated with a set of UE receive antenna ports based on the reference signal received from the base station, and transmit a channel state information report to the base station, the channel state information report including the channel state information associated with the set of UE receive antenna ports and an indication of the set of UE receive antenna ports. The communications manager 810 may also receive, from a base station, a configuration for reporting channel state information by the UE, the configuration indicating a group of receive antenna ports for the UE to associate with channel state information reports, generate channel state information associated with the group of receive antenna ports indicated by the configuration, and transmit, to the base station, a channel state information report including the channel state information associated with the group of receive antenna ports indicated by the configuration.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting channel state feedback for receive antenna switching).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
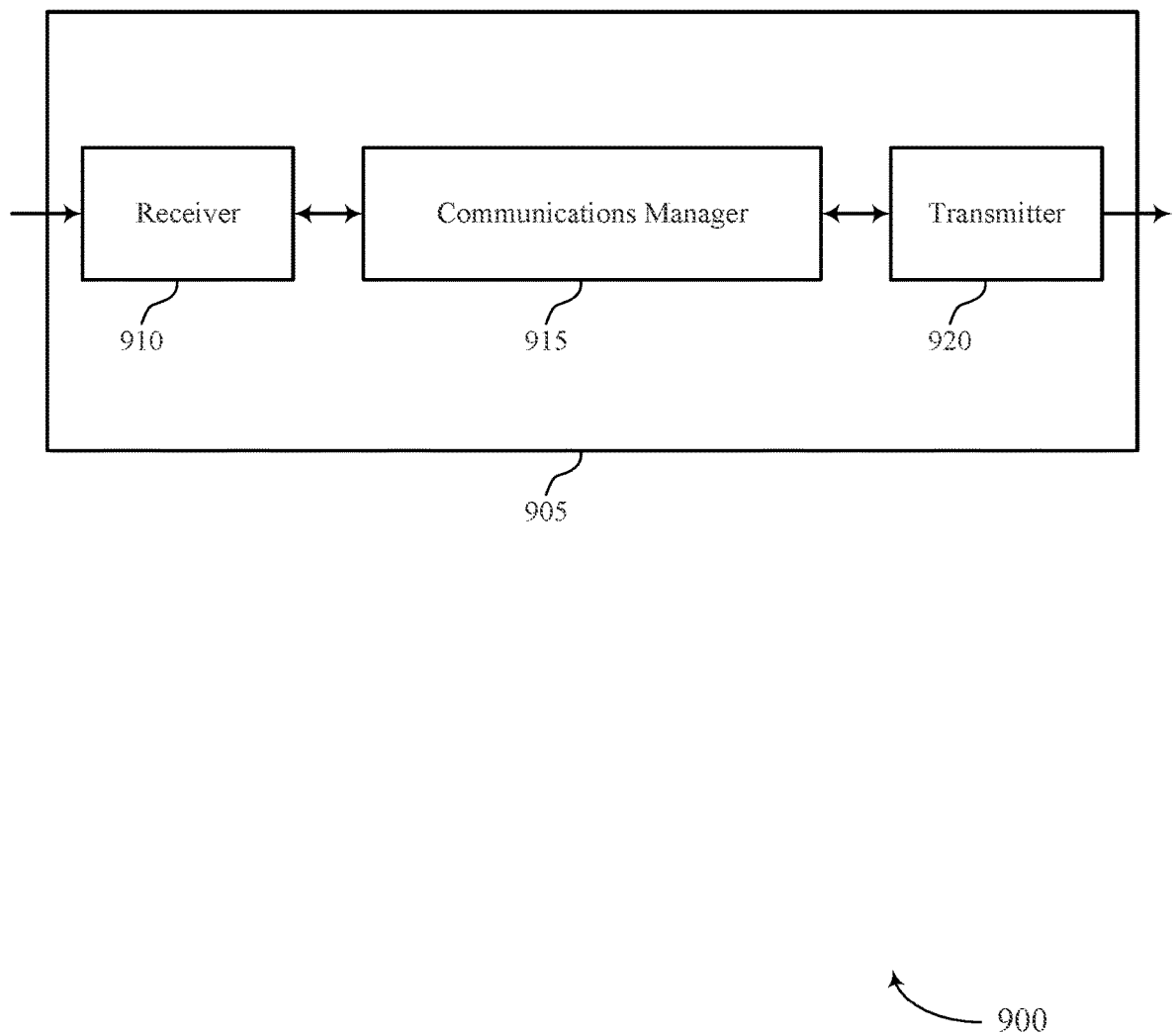
FIGS. 9 and 10 show diagrams of devices that support channel state feedback for receive antenna switching in accordance with aspects of the present disclosure.

FIG. 9 shows a diagram 900 of a device 905 that supports channel state feedback for receive antenna switching in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to channel state feedback for receive antenna switching, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit a set of reference signals to a UE, receive a channel state information report from the UE, the channel state information report including channel state information associated with set of receive antenna ports of the UE and an indication of the set of receive antenna ports, and communicate with the UE using a set of precoders associated with the set of receive antenna ports based on receiving the channel state information report. The communications manager 915 may also transmit, to a UE, a configuration for reporting channel state information, the configuration indicating a group of receive antenna ports for the UE to associate with a set of channel state information reports, receive, from the UE, a channel state information report including channel state information associated with the group of receive antenna ports indicated by the configuration, and determine a set precoders associated with the group of receive antenna ports based on receiving the channel state information report. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
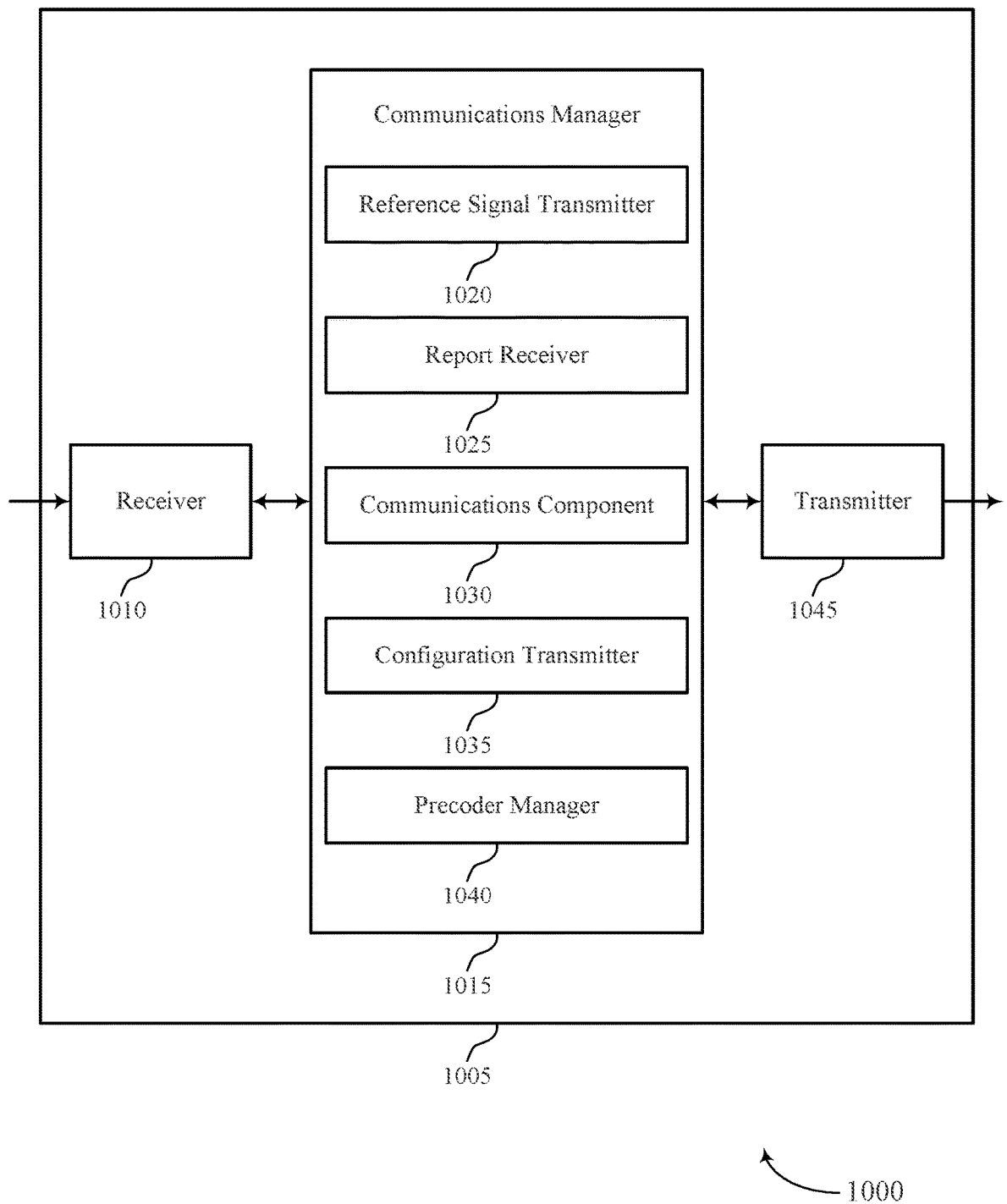

FIG. 10 shows a diagram 1000 of a device 1005 that supports channel state feedback for receive antenna switching in accordance with aspects of the present disclosure. The device 1005 may be an example of aspects of a device 905, or a base station 105 as described herein. The device 1005 may include a receiver 1010, a communications manager 1015, and a transmitter 1045. The device 1005 may also include a processor. Each of these components may be in communication with one another (e.g., via one or more buses).

The receiver 1010 may receive information such as packets, user data, or control information associated with various information channels (e.g., control channels, data channels, and information related to channel state feedback for receive antenna switching, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a reference signal transmitter 1020, a report receiver 1025, a communications component 1030, a configuration transmitter 1035, and a precoder manager 1040. The communications manager 1015 may be an example of aspects of the communications manager 1210 described herein.

The reference signal transmitter 1020 may transmit a set of reference signals to a UE.

The report receiver 1025 may receive a channel state information report from the UE, the channel state information report including channel state information associated with set of receive antenna ports of the UE and an indication of the set of receive antenna ports.

The communications component 1030 may communicate with the UE using a set of precoders associated with the set of receive antenna ports based on receiving the channel state information report.

The configuration transmitter 1035 may transmit, to a UE, a configuration for reporting channel state information, the configuration indicating a group of receive antenna ports for the UE to associate with a set of channel state information reports.

The report receiver 1025 may receive, from the UE, a channel state information report including channel state information associated with the group of receive antenna ports indicated by the configuration.

The precoder manager 1040 may determine a set precoders associated with the group of receive antenna ports based on receiving the channel state information report.

The transmitter 1045 may transmit signals generated by other components of the device 1005. In some examples, the transmitter 1045 may be collocated with a receiver 1010 in a transceiver module. For example, the transmitter 1045 may be an example of aspects of the transceiver 1220 described with reference to FIG. 12. The transmitter 1045 may utilize a single antenna or a set of antennas.

Figure 11:
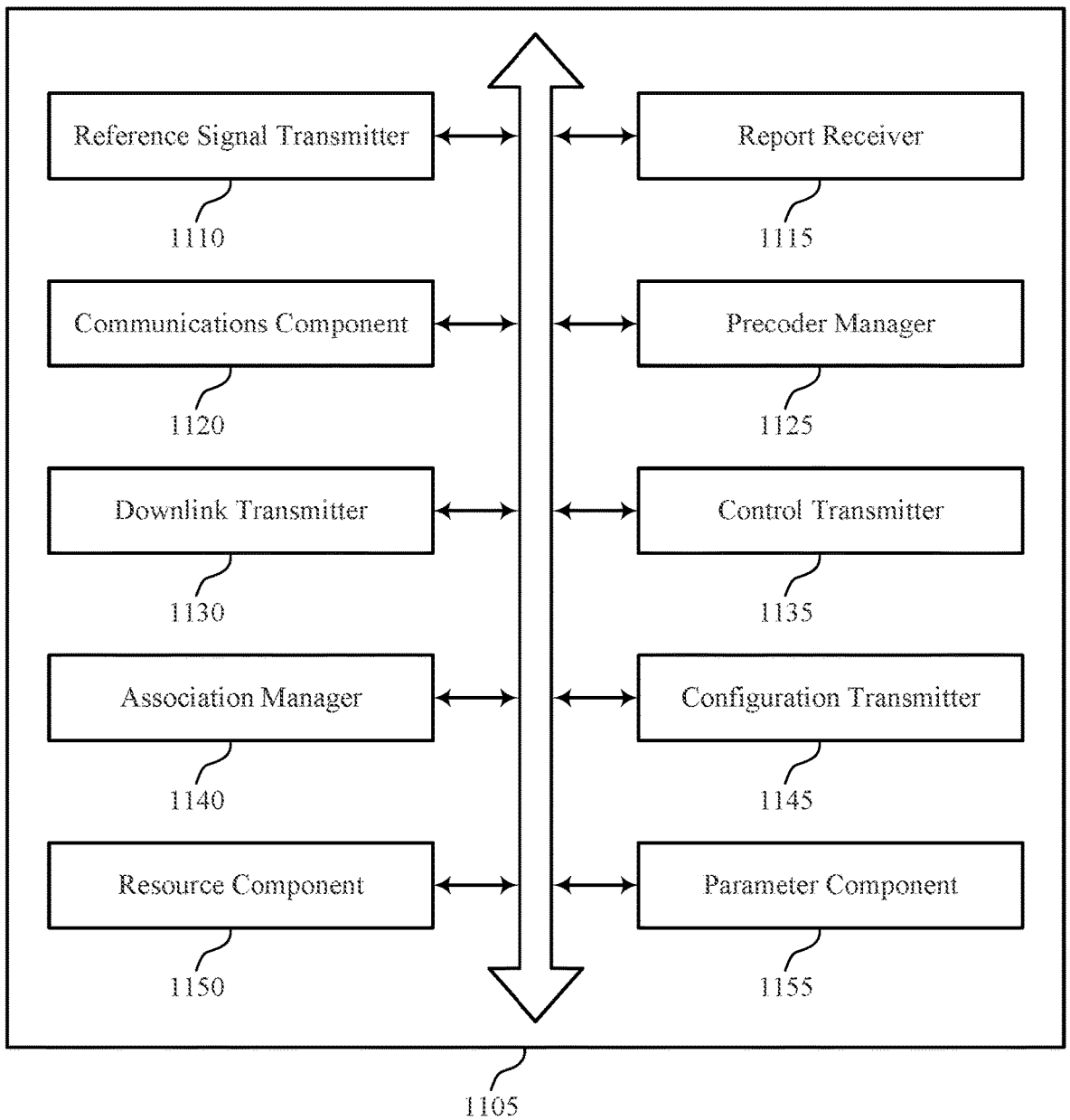
FIG. 11 shows a diagram of a communications manager that supports channel state feedback for receive antenna switching in accordance with aspects of the present disclosure.

FIG. 11 shows a diagram 1100 of a communications manager 1105 that supports channel state feedback for receive antenna switching in accordance with aspects of the present disclosure. The communications manager 1105 may be an example of aspects of a communications manager 915, a communications manager 1015, or a communications manager 1210 described herein. The communications manager 1105 may include a reference signal transmitter 1110, a report receiver 1115, a communications component 1120, a precoder manager 1125, a downlink transmitter 1130, a control transmitter 1135, an association manager 1140, a configuration transmitter 1145, a resource component 1150, and a parameter component 1155. Each of these modules may communicate, directly or indirectly, with one another (e.g., via one or more buses).

The reference signal transmitter 1110 may transmit a set of reference signals to a UE.

In some examples, the reference signal transmitter 1110 may transmit the reference signal via the set of repeated resources, where the channel state information is based on the reference signal.

In some examples, the reference signal transmitter 1110 may transmit the reference signal to the UE using the common precoder.

In some examples, the reference signal transmitter 1110 may transmit the set of reference signals to the UE based on the association.

In some examples, the reference signal transmitter 1110 may transmit a first reference signal of the reference signal during a first transmission occasion using a first precoder based on the association.

In some examples, the reference signal transmitter 1110 may transmit a second reference signal of the reference signal during a second transmission occasion using a second precoder based on the association.

The report receiver 1115 may receive a channel state information report from the UE, the channel state information report including channel state information associated with set of receive antenna ports of the UE and an indication of the set of receive antenna ports.

In some examples, the report receiver 1115 may receive, from the UE, a channel state information report including channel state information associated with the group of receive antenna ports indicated by the configuration.

In some examples, the report receiver 1115 may receive a set of channel quality parameters in the channel state information report, each channel quality parameter corresponding to a respective receive antenna port of the group of receive antenna ports.

In some cases, the channel state information report includes a set of channel quality parameters for the reference signal.

In some cases, each channel quality parameter of the set of channel quality parameters is associated with the set of receive antenna ports indicated by the channel state information report.

In some cases, the indication of the set of receive antenna ports includes a set of receive antenna ports indexes corresponding to the set of receive antenna ports.

In some cases, each channel quality parameter is corresponds to a respective repeated resource of a set of repeated resources for a set of reference signals.

The communications component 1120 may communicate with the UE using a set of precoders associated with the set of receive antenna ports based on receiving the channel state information report.

The precoder manager 1125 may determine a set precoders associated with the group of receive antenna ports based on receiving the channel state information report.

In some examples, the precoder manager 1125 may determine a set of precoders for a set of downlink messages based on the channel state information and the indication of the set of receive antenna ports.

In some examples, the precoder manager 1125 may determine a set of precoders for the downlink message based on the channel state information and the indication of the set of receive antenna ports.

In some examples, the precoder manager 1125 may determine the set precoders associated with the group of receive antenna ports based on the joint channel quality parameter and the set of differential channel quality parameters in the channel state information report.

The configuration transmitter 1145 may transmit, to a UE, a configuration for reporting channel state information, the configuration indicating a group of receive antenna ports for the UE to associate with a set of channel state information reports.

In some examples, the configuration transmitter 1145 may transmit an indication of the set of repeated resources in the configuration.

The downlink transmitter 1130 may transmit the set of downlink messages to the UE using the set of precoders.

In some examples, the downlink transmitter 1130 may transmit multiple repetitions of a downlink message to the UE using the set of precoders.

In some examples, the downlink transmitter 1130 may transmit the downlink message to the UE using the set of precoders.

In some examples, the downlink transmitter 1130 may transmit the set of downlink messages to the UE based on the precoder cycling.

The control transmitter 1135 may transmit a control channel message including scheduling information for a downlink message for the UE and an indication of a receive antenna port for the UE to use for receiving the downlink message.

In some examples, the control transmitter 1135 may transmit the indication via a transmission configuration indicator.

In some examples, the control transmitter 1135 may transmit the indication via downlink control information.

In some examples, transmitting downlink control information from the base station, where the downlink control information includes an indication of precoder cycling for a set of downlink messages for the UE.

The association manager 1140 may transmit an indication of an association between a resource for the reference signal and the receive antenna port.

In some examples, the association manager 1140 may determine an association between a downlink transmission occasion and a receive antenna port of the group of receive antenna ports.

The resource component 1150 may determine a set of repeated resources for a set of reference signals.

In some cases, the set of repeated resources are within a slot.

In some cases, the set of repeated resources are resources for channel state information reference signals.

The parameter component 1155 may receive a joint channel quality parameter that corresponds to the group of receive antenna ports in the channel state information report.

In some examples, the parameter component 1155 may receive a set of differential channel quality parameters corresponding to respective receive antenna ports of the group of antenna ports in the channel state information report, where each differential channel quality parameter corresponds to a difference in channel quality with respect to the joint channel quality parameter.

In some examples, the parameter component 1155 may receive a common channel quality parameter that corresponds to the group of receive antenna ports.

In some examples, the parameter component 1155 may determine a common precoder for a set of reference signals based on the common channel quality parameter.

In some examples, the parameter component 1155 may receive a common channel quality parameter in the channel state information report, the common channel quality parameter indicating a preference to disable receive antenna port switching at the UE.

In some cases, each differential channel quality parameter is a function of a number of repetitions of one or more reference signals from the base station.

Figure 12:
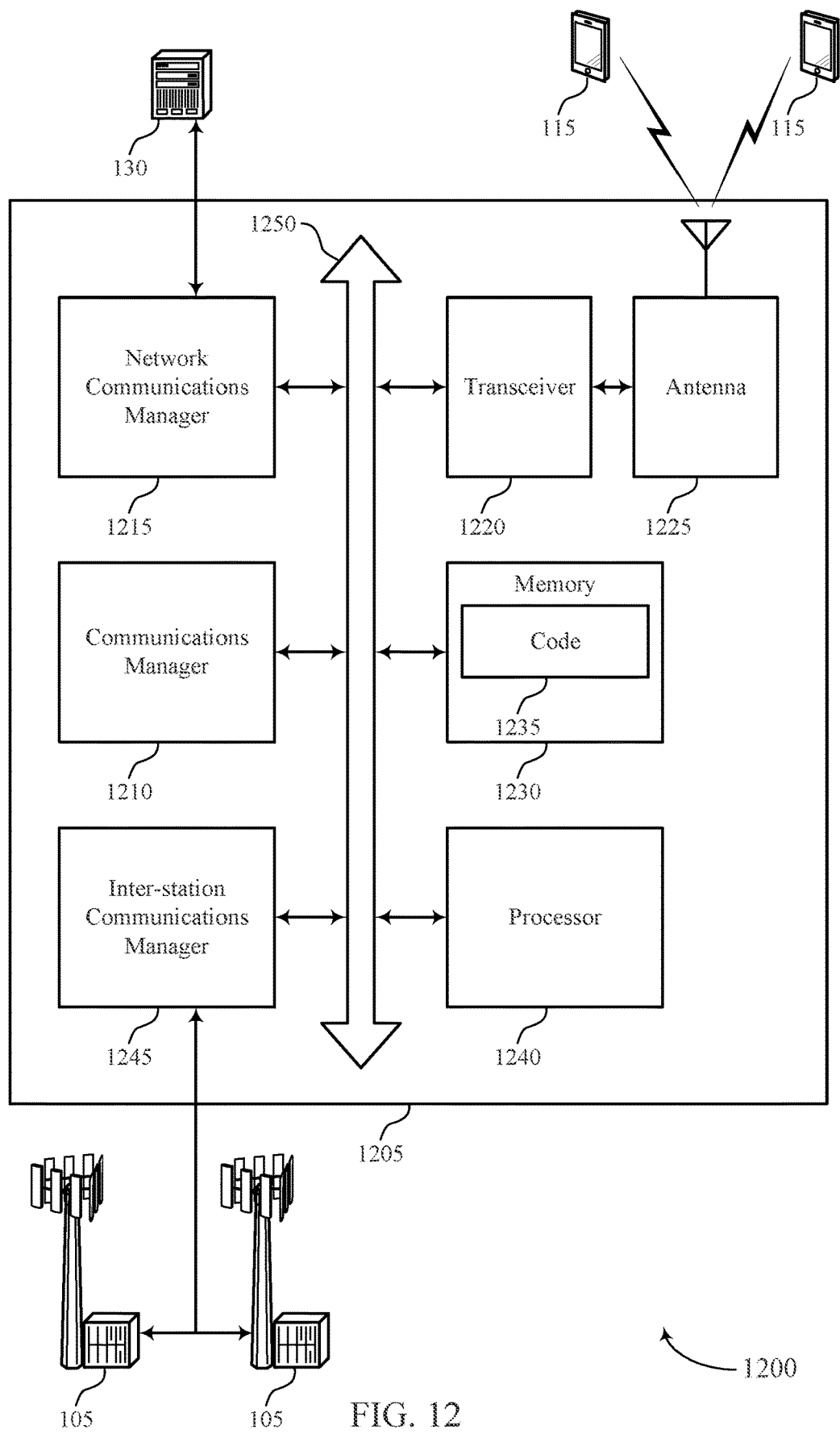
FIG. 12 shows a diagram of a system including a device that supports channel state feedback for receive antenna switching in accordance with aspects of the present disclosure.

FIG. 12 shows a diagram of a system 1200 including a device 1205 that supports channel state feedback for receive antenna switching in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit a set of reference signals to a UE, receive a channel state information report from the UE, the channel state information report including channel state information associated with set of receive antenna ports of the UE and an indication of the set of receive antenna ports, and communicate with the UE using a set of precoders associated with the set of receive antenna ports based on receiving the channel state information report. The communications manager 1210 may also transmit, to a UE, a configuration for reporting channel state information, the configuration indicating a group of receive antenna ports for the UE to associate with a set of channel state information reports, receive, from the UE, a channel state information report including channel state information associated with the group of receive antenna ports indicated by the configuration, and determine a set precoders associated with the group of receive antenna ports based on receiving the channel state information report.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting channel state feedback for receive antenna switching).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
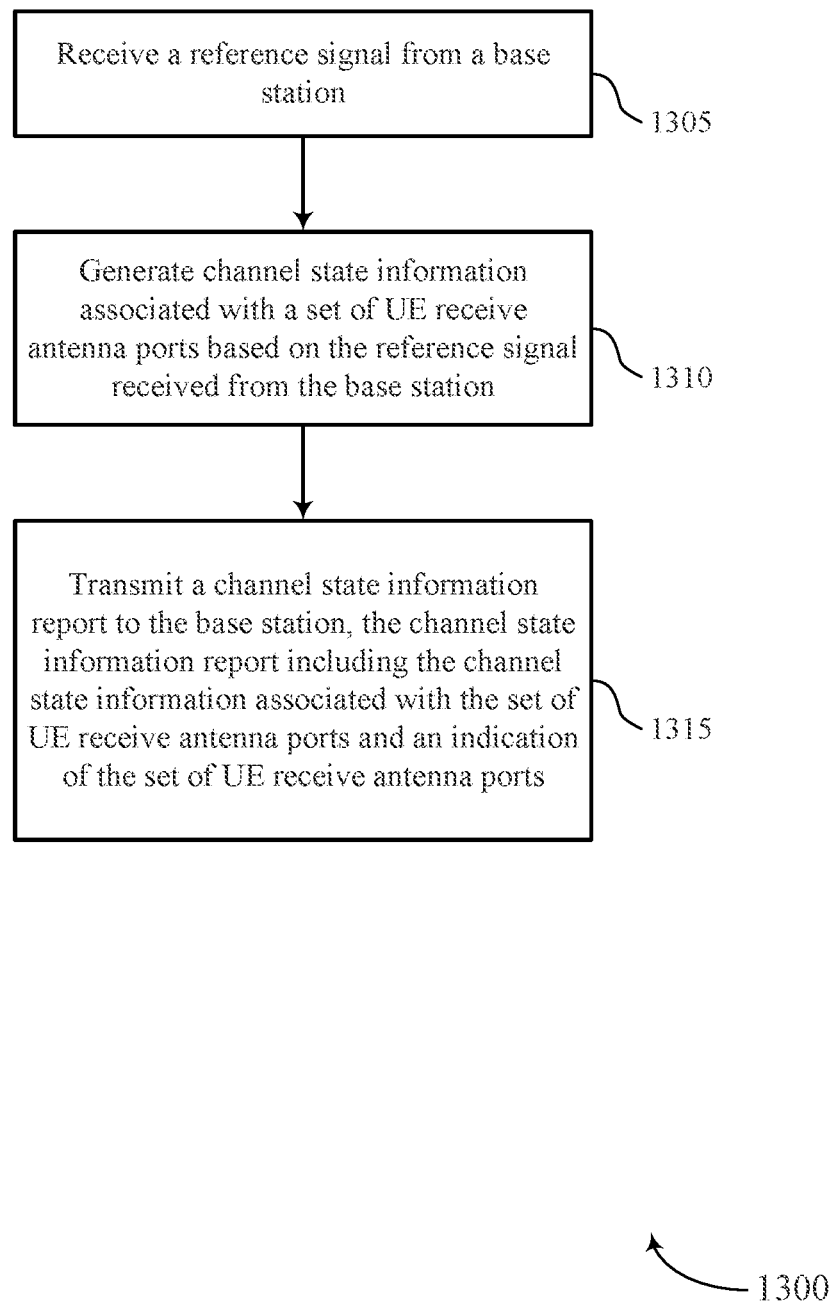
FIGS. 13 through 24 show flowcharts illustrating methods that support channel state feedback for receive antenna switching in accordance with aspects of the present disclosure.

FIG. 13 shows a flowchart illustrating a method 1300 that supports channel state feedback for receive antenna switching in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive a reference signal from a base station. The operations of 1305 may be performed according to the methods described herein. In some examples, aspects of the operations of 1305 may be performed by a reference signal receiver as described with reference to FIGS. 5 through 8.

At 1310, the UE may generate channel state information associated with a set of UE receive antenna ports based on the reference signal received from the base station. The operations of 1310 may be performed according to the methods described herein. In some examples, aspects of the operations of 1310 may be performed by a CSI manager as described with reference to FIGS. 5 through 8.

At 1315, the UE may transmit a channel state information report to the base station, the channel state information report including the channel state information associated with the set of UE receive antenna ports and an indication of the set of UE receive antenna ports. The operations of 1315 may be performed according to the methods described herein. In some examples, aspects of the operations of 1315 may be performed by a report transmitter as described with reference to FIGS. 5 through 8.

Figure 14:
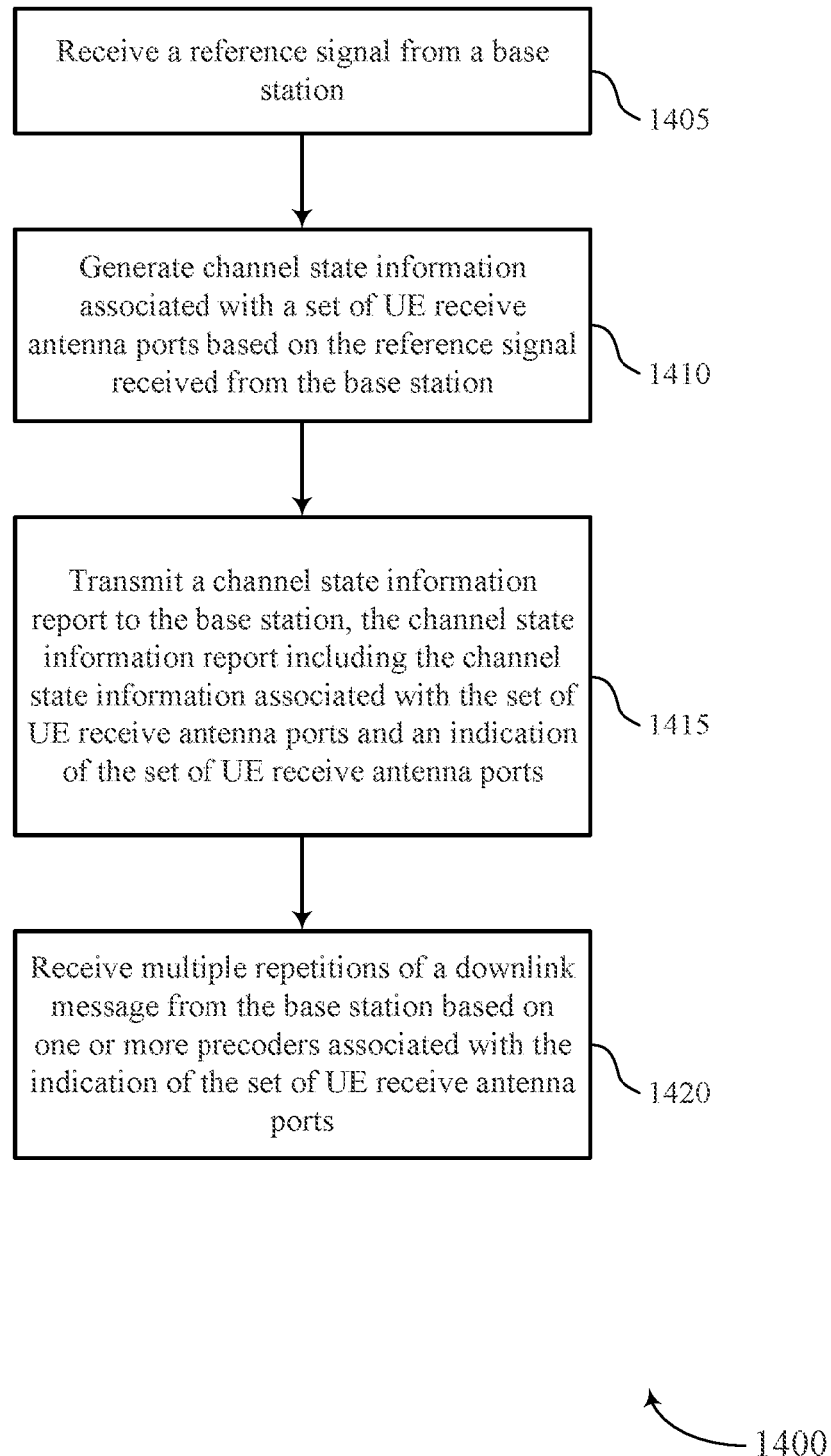

FIG. 14 shows a flowchart illustrating a method 1400 that supports channel state feedback for receive antenna switching in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive a reference signal from a base station. The operations of 1405 may be performed according to the methods described herein. In some examples, aspects of the operations of 1405 may be performed by a reference signal receiver as described with reference to FIGS. 5 through 8.

At 1410, the UE may generate channel state information associated with a set of UE receive antenna ports based on the reference signal received from the base station. The operations of 1410 may be performed according to the methods described herein. In some examples, aspects of the operations of 1410 may be performed by a CSI manager as described with reference to FIGS. 5 through 8.

At 1415, the UE may transmit a channel state information report to the base station, the channel state information report including the channel state information associated with the set of UE receive antenna ports and an indication of the set of UE receive antenna ports. The operations of 1415 may be performed according to the methods described herein. In some examples, aspects of the operations of 1415 may be performed by a report transmitter as described with reference to FIGS. 5 through 8.

At 1420, the UE may receive multiple repetitions of a downlink message from the base station based on one or more precoders associated with the indication of the set of UE receive antenna ports. The operations of 1420 may be performed according to the methods described herein. In some examples, aspects of the operations of 1420 may be performed by a downlink receiver as described with reference to FIGS. 5 through 8.

Figure 15:
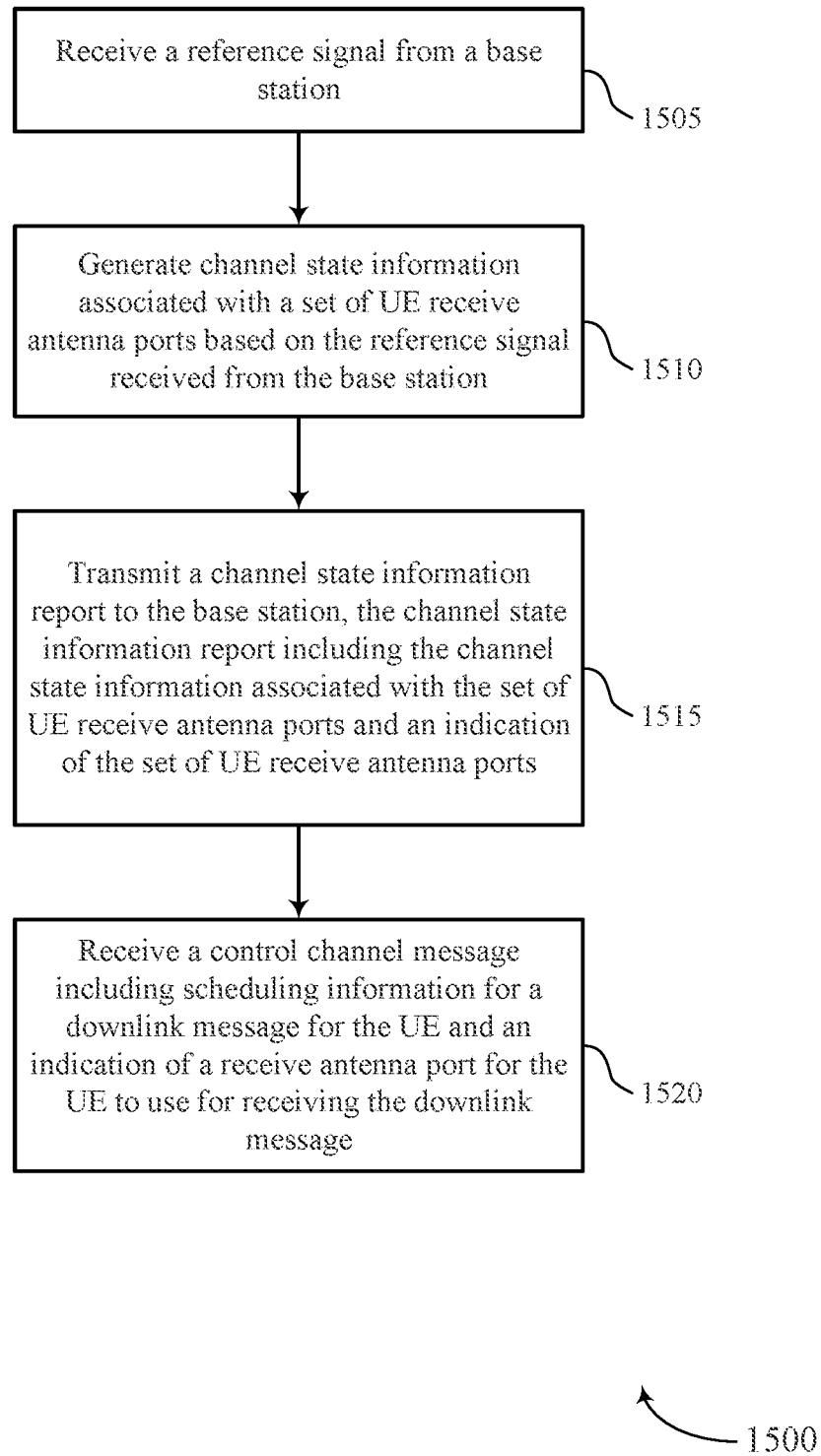

FIG. 15 shows a flowchart illustrating a method 1500 that supports channel state feedback for receive antenna switching in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive a reference signal from a base station. The operations of 1505 may be performed according to the methods described herein. In some examples, aspects of the operations of 1505 may be performed by a reference signal receiver as described with reference to FIGS. 5 through 8.

At 1510, the UE may generate channel state information associated with a set of UE receive antenna ports based on the reference signal received from the base station. The operations of 1510 may be performed according to the methods described herein. In some examples, aspects of the operations of 1510 may be performed by a CSI manager as described with reference to FIGS. 5 through 8.

At 1515, the UE may transmit a channel state information report to the base station, the channel state information report including the channel state information associated with the set of UE receive antenna ports and an indication of the set of UE receive antenna ports. The operations of 1515 may be performed according to the methods described herein. In some examples, aspects of the operations of 1515 may be performed by a report transmitter as described with reference to FIGS. 5 through 8.

At 1520, the UE may receive a control channel message including scheduling information for a downlink message for the UE and an indication of a receive antenna port for the UE to use for receiving the downlink message. The operations of 1520 may be performed according to the methods described herein. In some examples, aspects of the operations of 1520 may be performed by a control receiver as described with reference to FIGS. 5 through 8.

Figure 16:
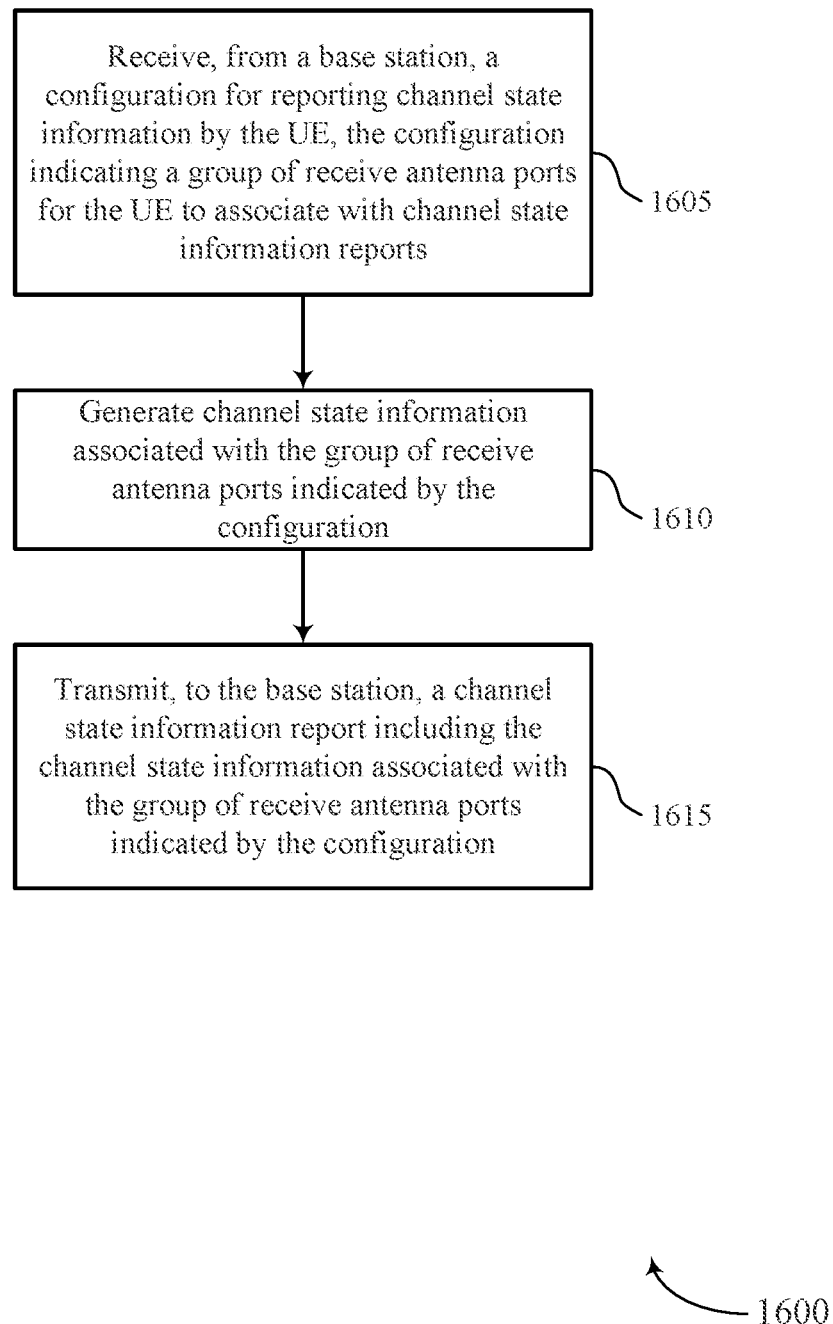

FIG. 16 shows a flowchart illustrating a method 1600 that supports channel state feedback for receive antenna switching in accordance with aspects of the present disclosure. The operations of method 1600 may be implemented by a UE 115 or its components as described herein. For example, the operations of method 1600 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, a configuration for reporting channel state information by the UE, the configuration indicating a group of receive antenna ports for the UE to associate with channel state information reports. The operations of 1605 may be performed according to the methods described herein. In some examples, aspects of the operations of 1605 may be performed by a configuration receiver as described with reference to FIGS. 5 through 8.

At 1610, the UE may generate channel state information associated with the group of receive antenna ports indicated by the configuration. The operations of 1610 may be performed according to the methods described herein. In some examples, aspects of the operations of 1610 may be performed by a CSI manager as described with reference to FIGS. 5 through 8.

At 1615, the UE may transmit, to the base station, a channel state information report including the channel state information associated with the group of receive antenna ports indicated by the configuration. The operations of 1615 may be performed according to the methods described herein. In some examples, aspects of the operations of 1615 may be performed by a report transmitter as described with reference to FIGS. 5 through 8.

Figure 17:
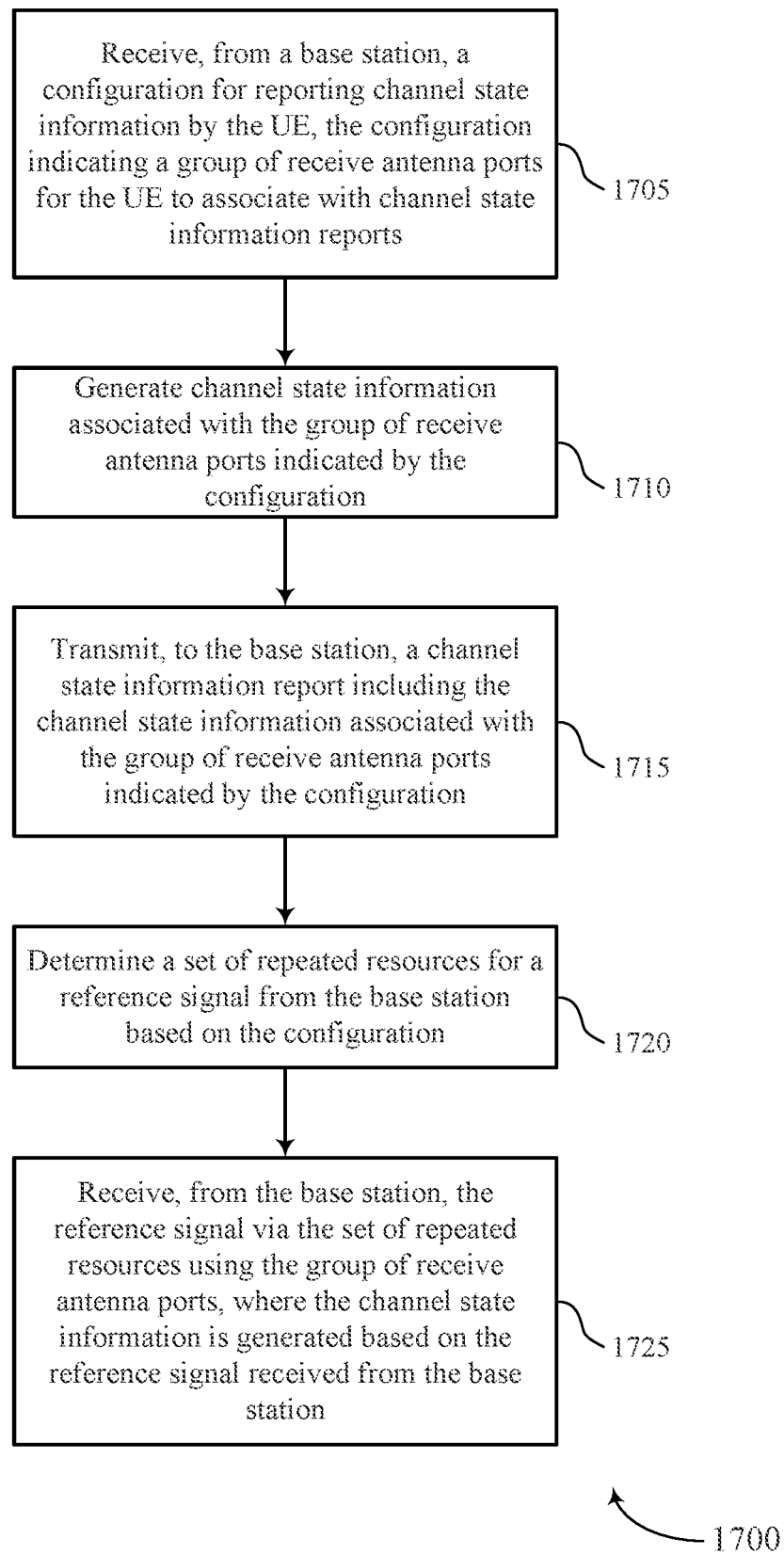

FIG. 17 shows a flowchart illustrating a method 1700 that supports channel state feedback for receive antenna switching in accordance with aspects of the present disclosure. The operations of method 1700 may be implemented by a UE 115 or its components as described herein. For example, the operations of method 1700 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station, a configuration for reporting channel state information by the UE, the configuration indicating a group of receive antenna ports for the UE to associate with channel state information reports. The operations of 1705 may be performed according to the methods described herein. In some examples, aspects of the operations of 1705 may be performed by a configuration receiver as described with reference to FIGS. 5 through 8.

At 1710, the UE may generate channel state information associated with the group of receive antenna ports indicated by the configuration. The operations of 1710 may be performed according to the methods described herein. In some examples, aspects of the operations of 1710 may be performed by a CSI manager as described with reference to FIGS. 5 through 8.

At 1715, the UE may transmit, to the base station, a channel state information report including the channel state information associated with the group of receive antenna ports indicated by the configuration. The operations of 1715 may be performed according to the methods described herein. In some examples, aspects of the operations of 1715 may be performed by a report transmitter as described with reference to FIGS. 5 through 8.

At 1720, the UE may determine a set of repeated resources for a reference signal from the base station based on the configuration. The operations of 1720 may be performed according to the methods described herein. In some examples, aspects of the operations of 1720 may be performed by a resource manager as described with reference to FIGS. 5 through 8.

At 1725, the UE may receive, from the base station, the reference signal via the set of repeated resources using the group of receive antenna ports, where the channel state information is generated based on the reference signal received from the base station. The operations of 1725 may be performed according to the methods described herein. In some examples, aspects of the operations of 1725 may be performed by a reference signal receiver as described with reference to FIGS. 5 through 8.

Figure 18:
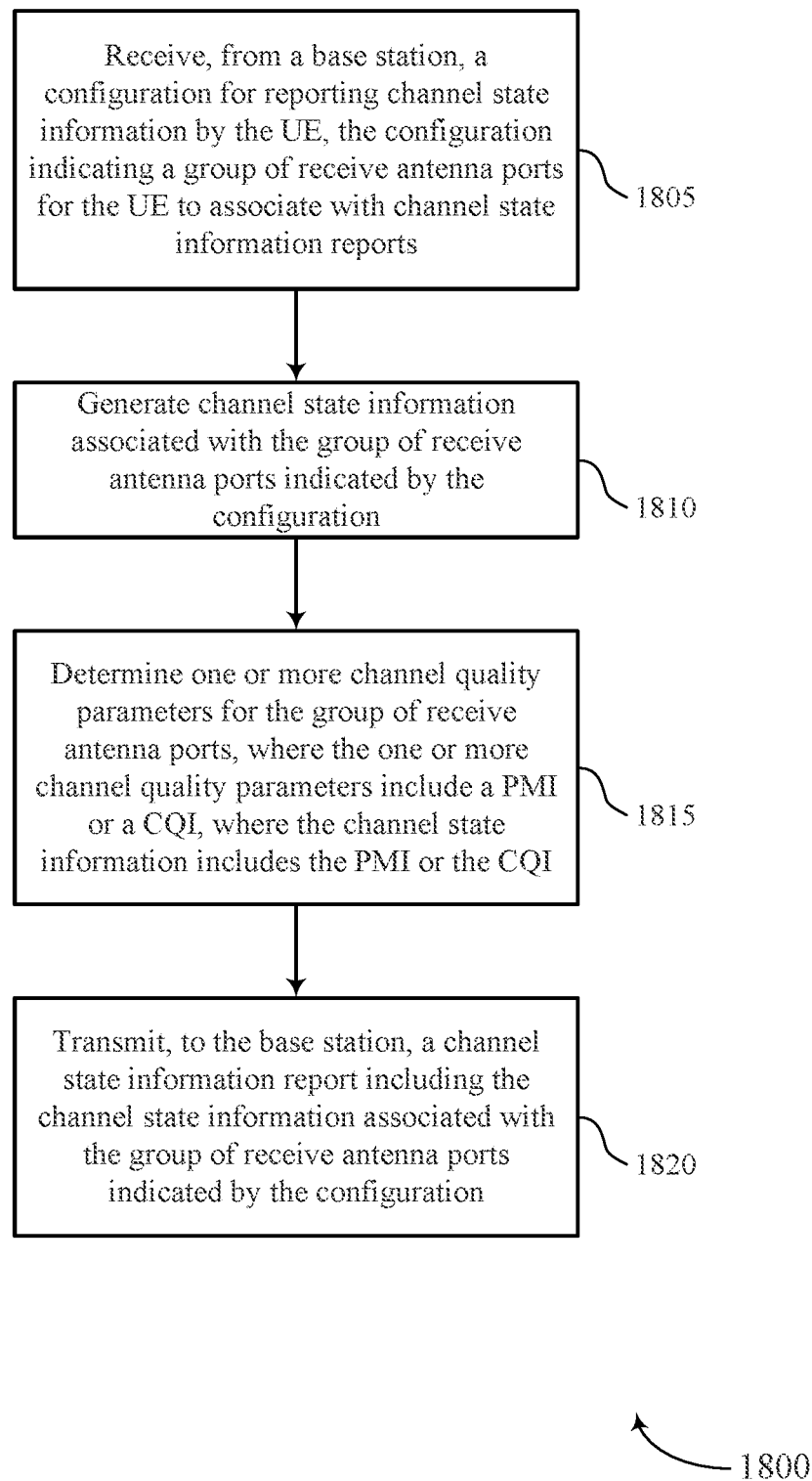

FIG. 18 shows a flowchart illustrating a method 1800 that supports channel state feedback for receive antenna switching in accordance with aspects of the present disclosure. The operations of method 1800 may be implemented by a UE 115 or its components as described herein. For example, the operations of method 1800 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1805, the UE may receive, from a base station, a configuration for reporting channel state information by the UE, the configuration indicating a group of receive antenna ports for the UE to associate with channel state information reports. The operations of 1805 may be performed according to the methods described herein. In some examples, aspects of the operations of 1805 may be performed by a configuration receiver as described with reference to FIGS. 5 through 8.

At 1810, the UE may generate channel state information associated with the group of receive antenna ports indicated by the configuration. The operations of 1810 may be performed according to the methods described herein. In some examples, aspects of the operations of 1810 may be performed by a CSI manager as described with reference to FIGS. 5 through 8.

At 1815, the UE may determine one or more channel quality parameters for the group of receive antenna ports, where the one or more channel quality parameters include a PMI or a CQI, where the channel state information includes the PMI or the CQI. The operations of 1815 may be performed according to the methods described herein. In some examples, aspects of the operations of 1815 may be performed by a CSI manager as described with reference to FIGS. 5 through 8.

At 1820, the UE may transmit, to the base station, a channel state information report including the channel state information associated with the group of receive antenna ports indicated by the configuration. The operations of 1820 may be performed according to the methods described herein. In some examples, aspects of the operations of 1820 may be performed by a report transmitter as described with reference to FIGS. 5 through 8.

Figure 19:
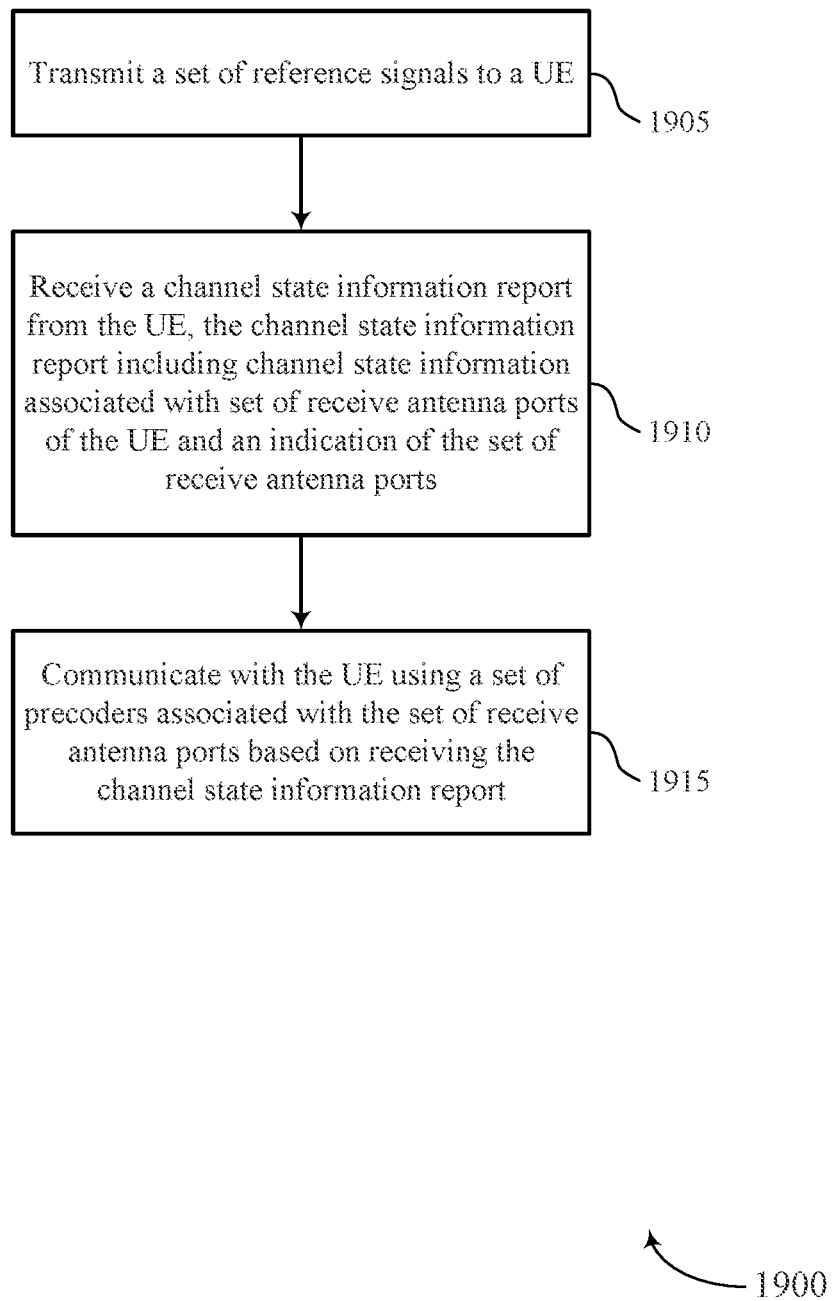

FIG. 19 shows a flowchart illustrating a method 1900 that supports channel state feedback for receive antenna switching in accordance with aspects of the present disclosure. The operations of method 1900 may be implemented by a base station 105 or its components as described herein. For example, the operations of method 1900 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1905, the base station may transmit a set of reference signals to a UE. The operations of 1905 may be performed according to the methods described herein. In some examples, aspects of the operations of 1905 may be performed by a reference signal transmitter as described with reference to FIGS. 9 through 12.

At 1910, the base station may receive a channel state information report from the UE, the channel state information report including channel state information associated with set of receive antenna ports of the UE and an indication of the set of receive antenna ports. The operations of 1910 may be performed according to the methods described herein. In some examples, aspects of the operations of 1910 may be performed by a report receiver as described with reference to FIGS. 9 through 12.

At 1915, the base station may communicate with the UE using a set of precoders associated with the set of receive antenna ports based on receiving the channel state information report. The operations of 1915 may be performed according to the methods described herein. In some examples, aspects of the operations of 1915 may be performed by a communications component as described with reference to FIGS. 9 through 12.

Figure 20:
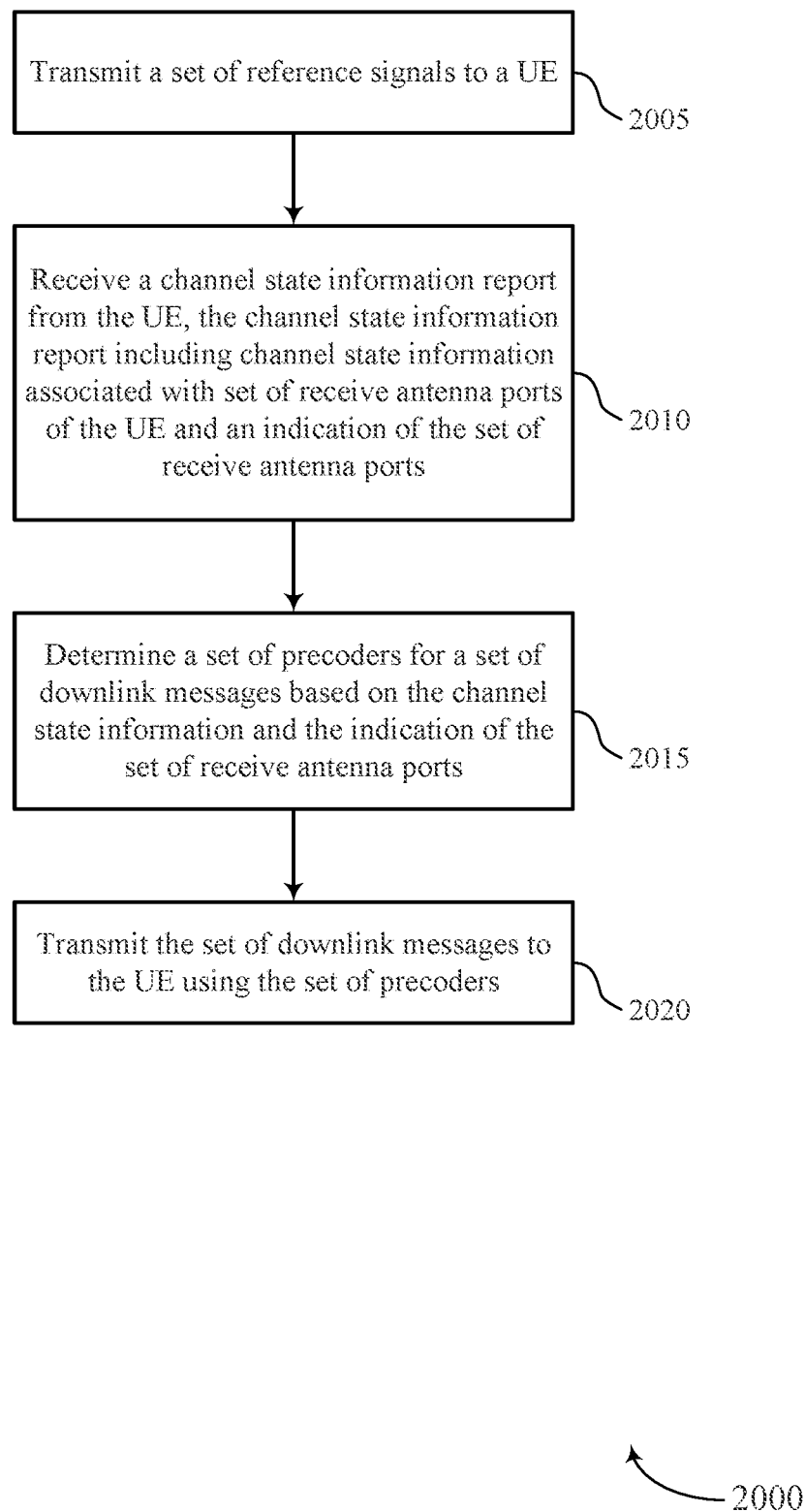

FIG. 20 shows a flowchart illustrating a method 2000 that supports channel state feedback for receive antenna switching in accordance with aspects of the present disclosure. The operations of method 2000 may be implemented by a base station 105 or its components as described herein. For example, the operations of method 2000 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 2005, the base station may transmit a set of reference signals to a UE. The operations of 2005 may be performed according to the methods described herein. In some examples, aspects of the operations of 2005 may be performed by a reference signal transmitter as described with reference to FIGS. 9 through 12.

At 2010, the base station may receive a channel state information report from the UE, the channel state information report including channel state information associated with set of receive antenna ports of the UE and an indication of the set of receive antenna ports. The operations of 2010 may be performed according to the methods described herein. In some examples, aspects of the operations of 2010 may be performed by a report receiver as described with reference to FIGS. 9 through 12.

At 2015, the base station may determine a set of precoders for a set of downlink messages based on the channel state information and the indication of the set of receive antenna ports. The operations of 2015 may be performed according to the methods described herein. In some examples, aspects of the operations of 2015 may be performed by a precoder manager as described with reference to FIGS. 9 through 12.

At 2020, the base station may transmit the set of downlink messages to the UE using the set of precoders. The operations of 2020 may be performed according to the methods described herein. In some examples, aspects of the operations of 2020 may be performed by a downlink transmitter as described with reference to FIGS. 9 through 12.

Figure 21:
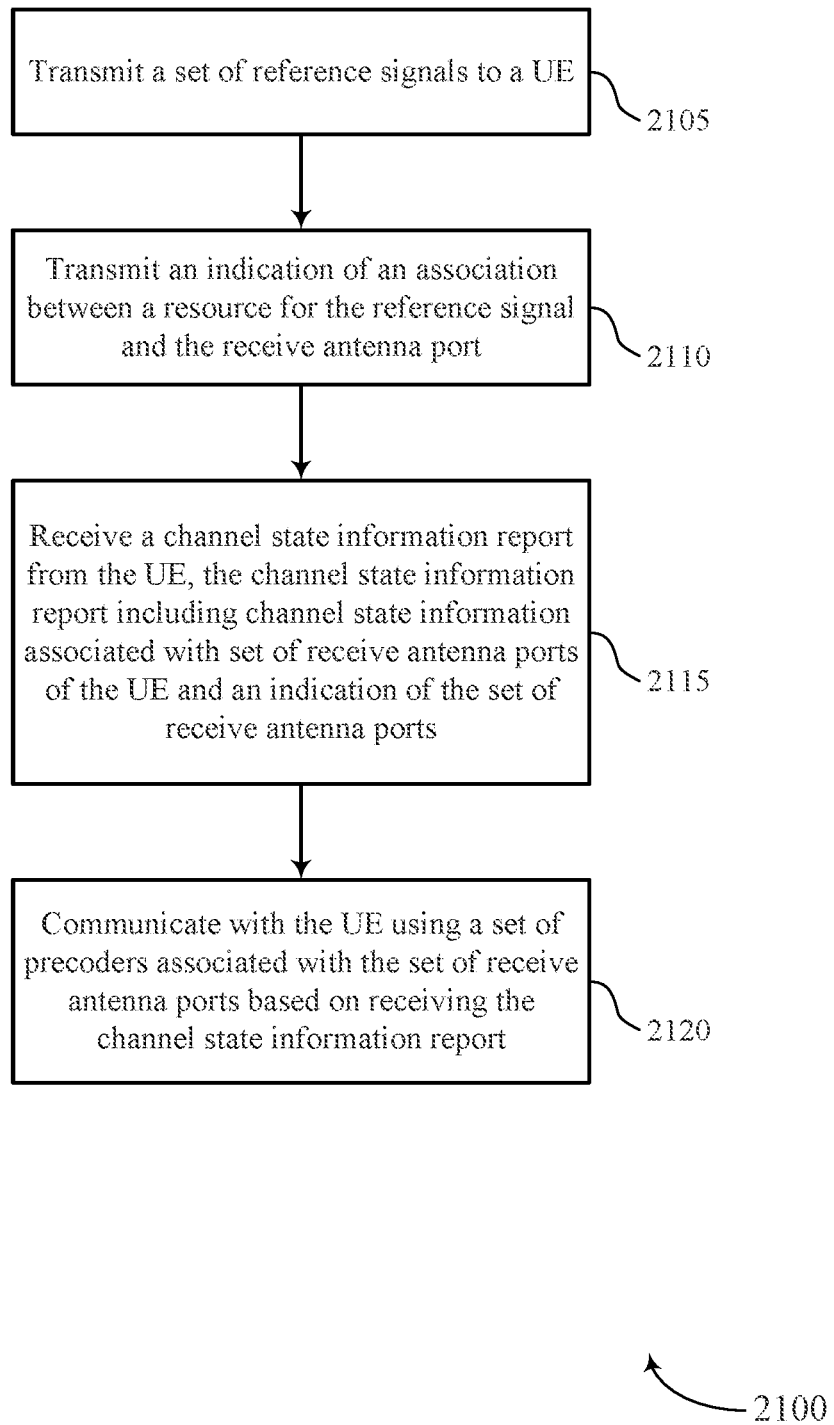

FIG. 21 shows a flowchart illustrating a method 2100 that supports channel state feedback for receive antenna switching in accordance with aspects of the present disclosure. The operations of method 2100 may be implemented by a base station 105 or its components as described herein. For example, the operations of method 2100 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 2105, the base station may transmit a set of reference signals to a UE. The operations of 2105 may be performed according to the methods described herein. In some examples, aspects of the operations of 2105 may be performed by a reference signal transmitter as described with reference to FIGS. 9 through 12.

At 2110, the base station may transmit an indication of an association between a resource for the reference signal and the receive antenna port. The operations of 2110 may be performed according to the methods described herein. In some examples, aspects of the operations of 2110 may be performed by an association manager as described with reference to FIGS. 9 through 12.

At 2115, the base station may receive a channel state information report from the UE, the channel state information report including channel state information associated with set of receive antenna ports of the UE and an indication of the set of receive antenna ports. The operations of 2115 may be performed according to the methods described herein. In some examples, aspects of the operations of 2115 may be performed by a report receiver as described with reference to FIGS. 9 through 12.

At 2120, the base station may communicate with the UE using a set of precoders associated with the set of receive antenna ports based on receiving the channel state information report. The operations of 2120 may be performed according to the methods described herein. In some examples, aspects of the operations of 2120 may be performed by a communications component as described with reference to FIGS. 9 through 12.

Figure 22:
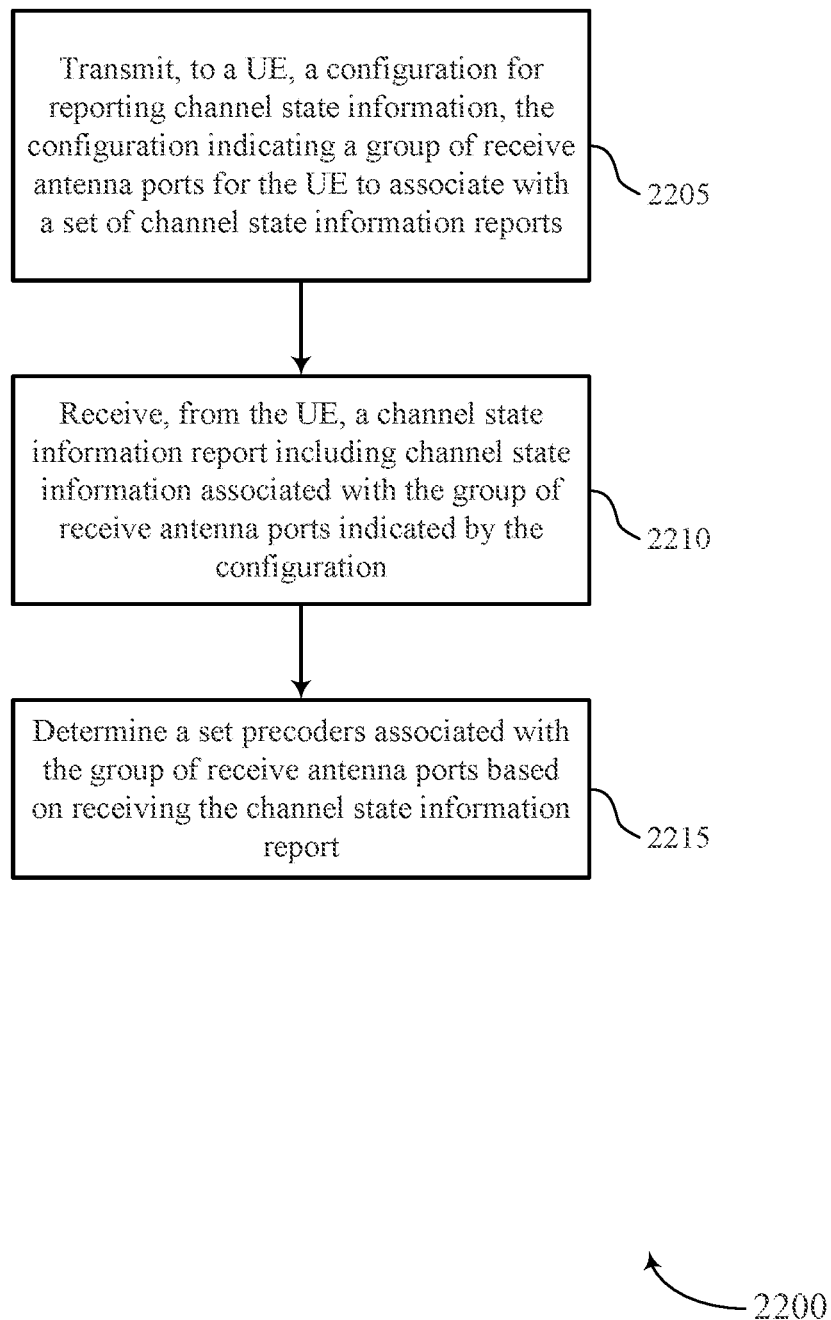

FIG. 22 shows a flowchart illustrating a method 2200 that supports channel state feedback for receive antenna switching in accordance with aspects of the present disclosure. The operations of method 2200 may be implemented by a base station 105 or its components as described herein. For example, the operations of method 2200 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 2205, the base station may transmit, to a UE, a configuration for reporting channel state information, the configuration indicating a group of receive antenna ports for the UE to associate with a set of channel state information reports. The operations of 2205 may be performed according to the methods described herein. In some examples, aspects of the operations of 2205 may be performed by a configuration transmitter as described with reference to FIGS. 9 through 12.

At 2210, the base station may receive, from the UE, a channel state information report including channel state information associated with the group of receive antenna ports indicated by the configuration. The operations of 2210 may be performed according to the methods described herein. In some examples, aspects of the operations of 2210 may be performed by a report receiver as described with reference to FIGS. 9 through 12.

At 2215, the base station may determine a set precoders associated with the group of receive antenna ports based on receiving the channel state information report. The operations of 2215 may be performed according to the methods described herein. In some examples, aspects of the operations of 2215 may be performed by a precoder manager as described with reference to FIGS. 9 through 12.

Figure 23:
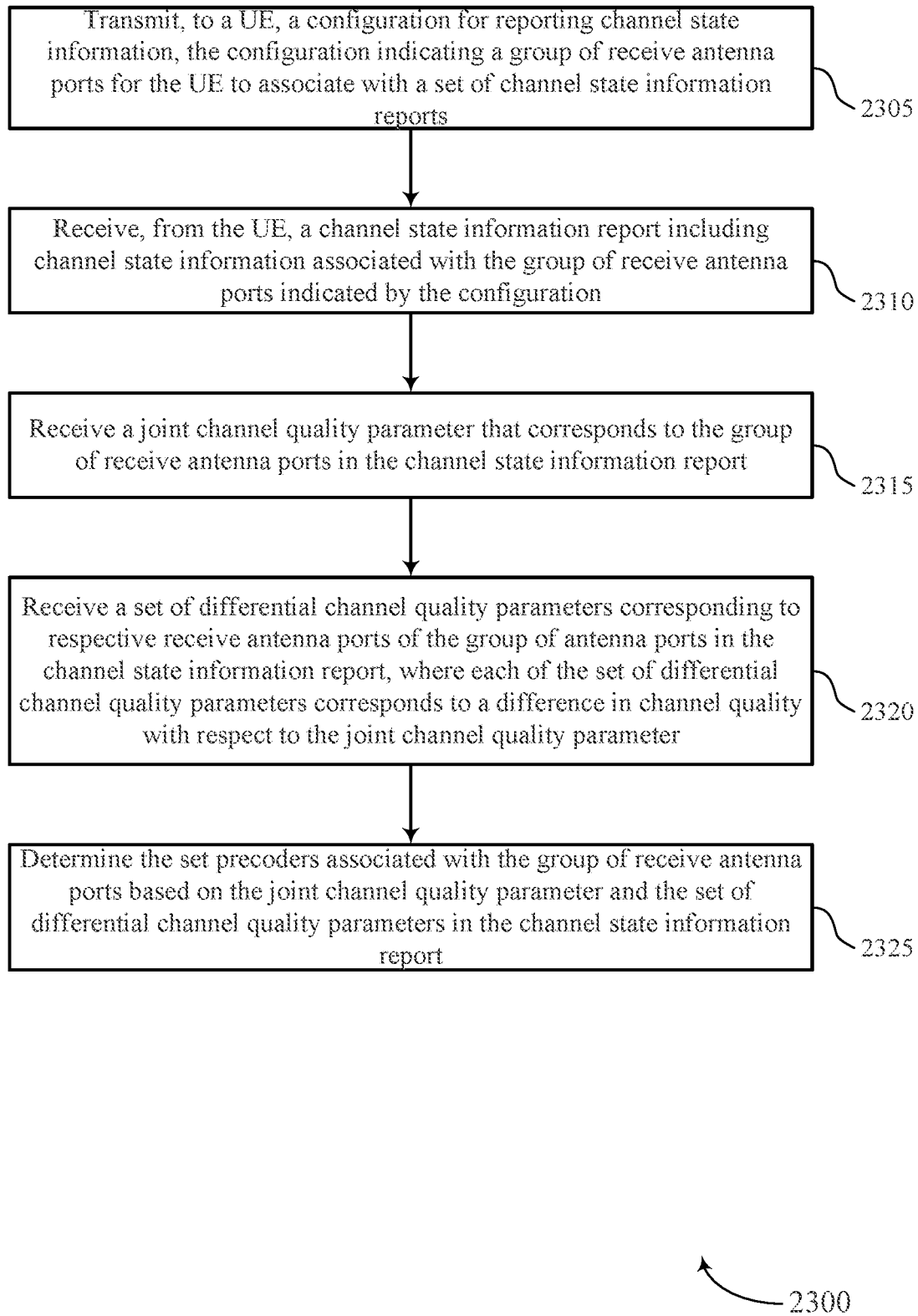

FIG. 23 shows a flowchart illustrating a method 2300 that supports channel state feedback for receive antenna switching in accordance with aspects of the present disclosure. The operations of method 2300 may be implemented by a base station 105 or its components as described herein. For example, the operations of method 2300 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 2305, the base station may transmit, to a UE, a configuration for reporting channel state information, the configuration indicating a group of receive antenna ports for the UE to associate with a set of channel state information reports. The operations of 2305 may be performed according to the methods described herein. In some examples, aspects of the operations of 2305 may be performed by a configuration transmitter as described with reference to FIGS. 9 through 12.

At 2310, the base station may receive, from the UE, a channel state information report including channel state information associated with the group of receive antenna ports indicated by the configuration. The operations of 2310 may be performed according to the methods described herein. In some examples, aspects of the operations of 2310 may be performed by a report receiver as described with reference to FIGS. 9 through 12.

At 2315, the base station may receive a joint channel quality parameter that corresponds to the group of receive antenna ports in the channel state information report. The operations of 2315 may be performed according to the methods described herein. In some examples, aspects of the operations of 2315 may be performed by a parameter component as described with reference to FIGS. 9 through 12.

At 2320, the base station may receive a set of differential channel quality parameters corresponding to respective receive antenna ports of the group of antenna ports in the channel state information report, where each differential channel quality parameter corresponds to a difference in channel quality with respect to the joint channel quality parameter. The operations of 2320 may be performed according to the methods described herein. In some examples, aspects of the operations of 2320 may be performed by a parameter component as described with reference to FIGS. 9 through 12.

At 2325, the base station may determine the set precoders associated with the group of receive antenna ports based on the joint channel quality parameter and the set of differential channel quality parameters in the channel state information report. The operations of 2325 may be performed according to the methods described herein. In some examples, aspects of the operations of 2325 may be performed by a precoder manager as described with reference to FIGS. 9 through 12.

Figure 24:
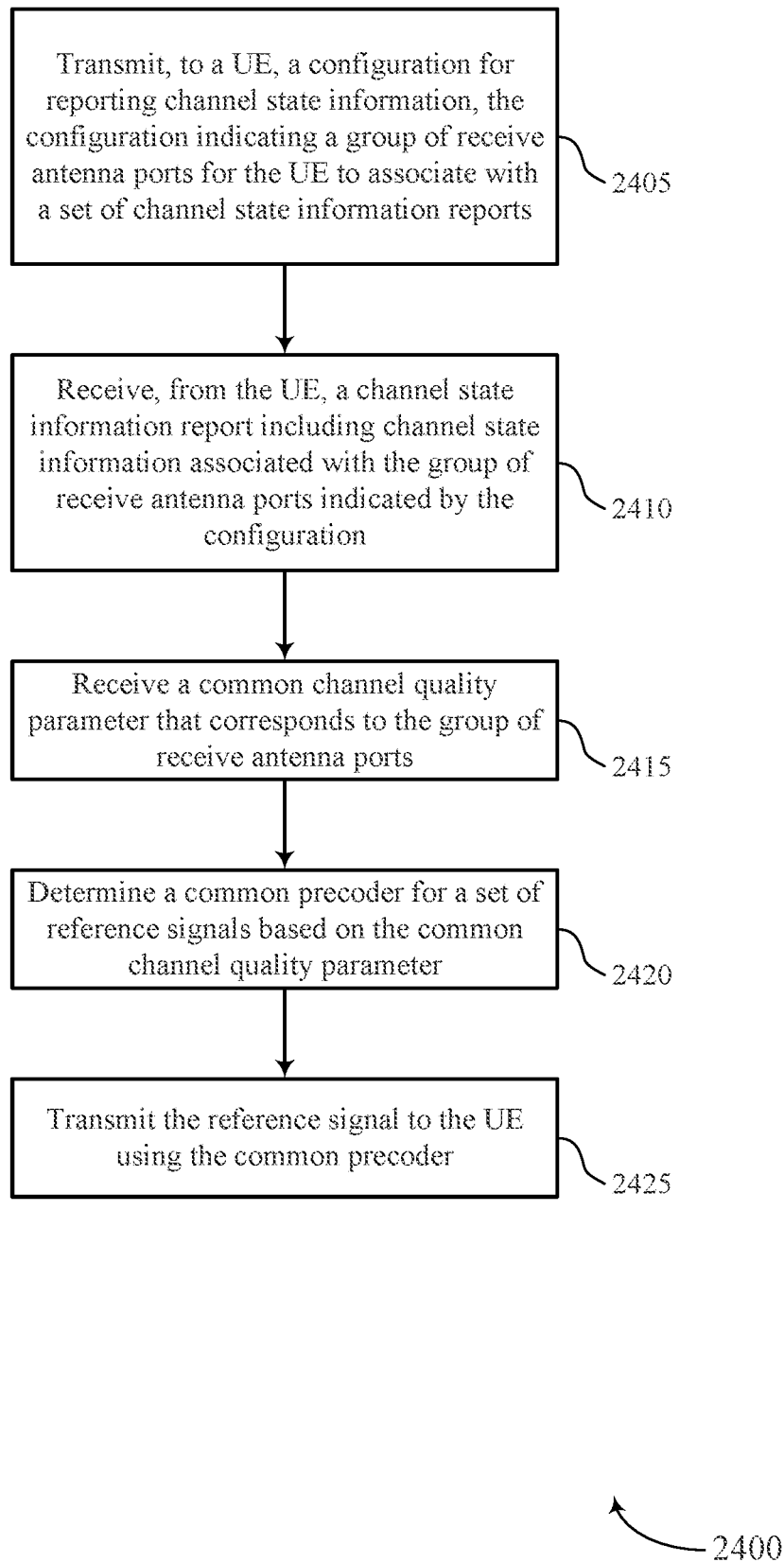

FIG. 24 shows a flowchart illustrating a method 2400 that supports channel state feedback for receive antenna switching in accordance with aspects of the present disclosure. The operations of method 2400 may be implemented by a base station 105 or its components as described herein. For example, the operations of method 2400 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 2405, the base station may transmit, to a UE, a configuration for reporting channel state information, the configuration indicating a group of receive antenna ports for the UE to associate with a set of channel state information reports. The operations of 2405 may be performed according to the methods described herein. In some examples, aspects of the operations of 2405 may be performed by a configuration transmitter as described with reference to FIGS. 9 through 12.

At 2410, the base station may receive, from the UE, a channel state information report including channel state information associated with the group of receive antenna ports indicated by the configuration. The operations of 2410 may be performed according to the methods described herein. In some examples, aspects of the operations of 2410 may be performed by a report receiver as described with reference to FIGS. 9 through 12.

At 2415, the base station may receive a common channel quality parameter that corresponds to the group of receive antenna ports. The operations of 2415 may be performed according to the methods described herein. In some examples, aspects of the operations of 2415 may be performed by a parameter component as described with reference to FIGS. 9 through 12.

At 2420, the base station may determine a common precoder for a set of reference signals based on the common channel quality parameter. The operations of 2420 may be performed according to the methods described herein. In some examples, aspects of the operations of 2420 may be performed by a parameter component as described with reference to FIGS. 9 through 12.

At 2425, the base station may transmit the reference signal to the UE using the common precoder. The operations of 2425 may be performed according to the methods described herein. In some examples, aspects of the operations of 2425 may be performed by a reference signal transmitter as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving, from a network device, a configuration for reporting channel state information by the UE, the configuration indicating a group of receive port identifiers corresponding to a group of receive antenna ports of the UE for the UE to associate with channel state information reports;
   receiving, from the network device, a set of reference signals based at least in part on the configuration;
   generating channel state information associated with the group of receive antenna ports of the UE indicated by the configuration based at least in part on receiving the set of reference signals; and
   transmitting, to the network device, a channel state information report comprising the channel state information associated with the group of receive antenna ports of the UE indicated by the configuration.

2. The method of claim 1, further comprising:
   determining a set of repeated resources for a reference signal of the set of reference signals from the network device according to the configuration, wherein the set of repeated resources are within a slot, and wherein the set of repeated resources are resources for channel state information reference signals; and
   receiving, from the network device, the reference signal via the set of repeated resources using the group of receive antenna ports, wherein the channel state information is generated in accordance with the reference signal received from the network device.

3. The method of claim 1, further comprising:
   determining one or more channel quality parameters for the group of receive antenna ports, wherein the one or more channel quality parameters comprise a precoding matrix indicator (PMI) or a channel quality indicator (CQI).

4. The method of claim 1, further comprising:
   determining a set of channel quality parameters, each channel quality parameter corresponding to a respective receive antenna port of the group of receive antenna ports and corresponding to a respective repeated resource of a set of repeated resources for the set of reference signals; and
   transmitting the set of channel quality parameters in the channel state information report.

5. The method of claim 1, further comprising:
   determining a joint channel quality parameter that corresponds to the group of receive antenna ports;
   determining a set of differential channel quality parameters corresponding to respective receive antenna ports of the group of receive antenna ports, wherein each differential channel quality parameter corresponds to a difference in channel quality with respect to the joint channel quality parameter and is a function of a number of repetitions of one or more reference signals of the set of reference signals from the network device; and
   transmitting the joint channel quality parameter and the set of differential channel quality parameters in the channel state information report.

6. The method of claim 1, further comprising:
   determining a common channel quality parameter that corresponds to the group of receive antenna ports;
   transmitting the common channel quality parameter in the channel state information report; and
   receiving multiple reference signals of the set of reference signals using a common precoder corresponding to the common channel quality parameter and the group of receive antenna ports.

7. The method of claim 1, further comprising:
   determining an association between a downlink transmission occasion and a receive antenna port of the group of receive antenna ports; and wherein receiving the set of reference signals comprises:

receiving a first reference signal of the set of reference signals during a first transmission occasion using a first receive antenna port of the group in accordance with the association; and receiving a second reference signal of the set of reference signals during a second transmission occasion using a second receive antenna port of the group in accordance with the association.

8. The method of claim 1, further comprising:

transmitting a common channel quality parameter in the channel state information report, the common channel quality parameter indicating a preference to disable receive antenna port switching at the UE.

9. The method of claim 1, further comprising:

receiving downlink control information from the network device, wherein the downlink control information comprises an indication of precoder cycling for a set of downlink messages from the network device; and receiving the set of downlink messages using a set of receive antenna ports of the group of receive antenna ports according to the precoder cycling.

10. The method of claim 1, further comprising:

receiving a reference signal of the set of reference signals from the network device; and generating the channel state information using the reference signal.

11. A method for wireless communications at a network device, comprising:

transmitting, to a user equipment (UE), a configuration for reporting channel state information, the configuration indicating a group of receive port identifiers corresponding to a group of receive antenna ports of the UE for the UE to associate with a set of channel state information reports;

transmitting, to the UE, a set of reference signals based at least in part on the configuration;

receiving, from the UE, a channel state information report comprising channel state information associated with the group of receive antenna ports of the UE indicated by the configuration based at least in part on transmitting the set of reference signals; and determining a plurality precoders associated with the group of receive antenna ports of the UE in accordance with receiving the channel state information report.

12. The method of claim 11, further comprising:

determining a set of repeated resources for the set of reference signals;

transmitting an indication of the set of repeated resources in the configuration; and transmitting the set of reference signals via the set of repeated resources, wherein the channel state information is in accordance with the set of reference signals.

13. The method of claim 11, receiving the channel state information report comprises:

receiving a set of channel quality parameters in the channel state information report, each channel quality parameter corresponding to a respective receive antenna port of the group of receive antenna ports, wherein each channel quality parameter corresponds to a respective repeated resource of a set of repeated resources for the set of reference signals.

14. The method of claim 11, further comprising:

receiving a joint channel quality parameter that corresponds to the group of receive antenna ports in the channel state information report;

receiving a set of differential channel quality parameters corresponding to respective receive antenna ports of the group of receive antenna ports in the channel state information report, wherein each differential channel quality parameter corresponds to a difference in channel quality with respect to the joint channel quality parameter and is a function of a number of repetitions of one or more reference signals of the set of reference signals from the network device; and determining the plurality precoders associated with the group of receive antenna ports according to the joint channel quality parameter and the set of differential channel quality parameters in the channel state information report.

15. The method of claim 11, further comprising:

receiving a common channel quality parameter that corresponds to the group of receive antenna ports;

determining a common precoder for the set of reference signals according to the common channel quality parameter; and transmitting a reference signal of the set of reference signals to the UE using the common precoder.

16. The method of claim 11, further comprising:

determining an association between a downlink transmission occasion and a receive antenna port of the group of receive antenna ports; and wherein transmitting the set of reference signals comprises:

transmitting a first reference signal of the set of reference signals during a first transmission occasion using a first precoder in accordance with the association; and transmitting a second reference signal of the set of reference signals during a second transmission occasion using a second precoder in accordance with the association.

17. The method of claim 11, further comprising:

receiving a common channel quality parameter in the channel state information report, the common channel quality parameter indicating a preference to disable receive antenna port switching at the UE.

18. The method of claim 11, further comprising:

transmitting downlink control information from the network device, wherein the downlink control information comprises an indication of precoder cycling for a set of downlink messages for the UE; and transmitting the set of downlink messages to the UE according to the precoder cycling.

* * * * *